United States Patent
Ono

(10) Patent No.: US 10,379,412 B2
(45) Date of Patent: Aug. 13, 2019

(54) LIQUID CRYSTAL DISPLAY DEVICE

(71) Applicant: Panasonic Liquid Crystal Display Co., Ltd., Himeji-shi, Hyogo (JP)

(72) Inventor: Kikuo Ono, Ibaraki (JP)

(73) Assignee: Panasonic Liquid Crystal Display Co., Ltd., Hyogo (JP)

(*) Notice: Subject to any disclaimer, the term of this patent is extended or adjusted under 35 U.S.C. 154(b) by 0 days.

(21) Appl. No.: 15/707,711

(22) Filed: Sep. 18, 2017

(65) Prior Publication Data

US 2018/0081229 A1 Mar. 22, 2018

(30) Foreign Application Priority Data

Sep. 21, 2016 (JP) .................. 2016-183832

(51) Int. Cl.
*G02F 1/1347* (2006.01)
*G02F 1/1335* (2006.01)
(Continued)

(52) U.S. Cl.
CPC .... *G02F 1/13471* (2013.01); *G02F 1/133512* (2013.01); *G02F 1/133528* (2013.01); *G02F 1/133602* (2013.01); *G09G 3/3406* (2013.01); *G09G 3/3611* (2013.01); *G02F 2001/133622* (2013.01); *G09G 2300/023* (2013.01); *G09G 2300/0439* (2013.01); *G09G 2310/0235* (2013.01); *G09G 2320/02* (2013.01); *G09G 2320/0209* (2013.01)

(58) Field of Classification Search
CPC ...... G09G 2300/023; G09G 2310/0235; G02F 1/1347; G02F 1/13471
See application file for complete search history.

(56) References Cited

U.S. PATENT DOCUMENTS

2007/0063925 A1* 3/2007 Yoshihara ............. G02F 1/1347 345/4
2009/0147186 A1* 6/2009 Nakai ................. G02F 1/13471 349/74
(Continued)

FOREIGN PATENT DOCUMENTS

JP 2015-197578 11/2015
WO 2007/040127 4/2007

OTHER PUBLICATIONS

Search Report issued in International Application No. PCT/JP2017/033571, dated Nov. 14, 2017, 3 pages with translation.
(Continued)

*Primary Examiner* — Thanh Nhan P Nguyen
(74) *Attorney, Agent, or Firm* — Hamre, Schumann, Mueller & Larson, P.C.

(57) ABSTRACT

A liquid crystal display device comprises: a first display panel and a second display panel, which are overlapping each other; and a backlight disposed on rear surface sides of the first display panel and the second display panel. The backlight irradiates the first display panel and the second display panel with light beams in a plurality of colors while sequentially switching the light beams. Each of the first display panel and the second display panel includes a plurality of pixels. An area of the pixel included in the first display panel is smaller than an area of the pixel included in the second display panel.

6 Claims, 22 Drawing Sheets

(51) Int. Cl.
*G09G 3/34* (2006.01)
*G09G 3/36* (2006.01)

(56) References Cited

U.S. PATENT DOCUMENTS

2011/0261268 A1  10/2011  Nakai et al.
2017/0115527 A1  4/2017   Kita et al.
2017/0176790 A1  6/2017   Guo et al.

OTHER PUBLICATIONS

Office Action issued in corresponding U.S. Appl. No. 15/877,402, dated May 15, 2019, 21 pages.

* cited by examiner

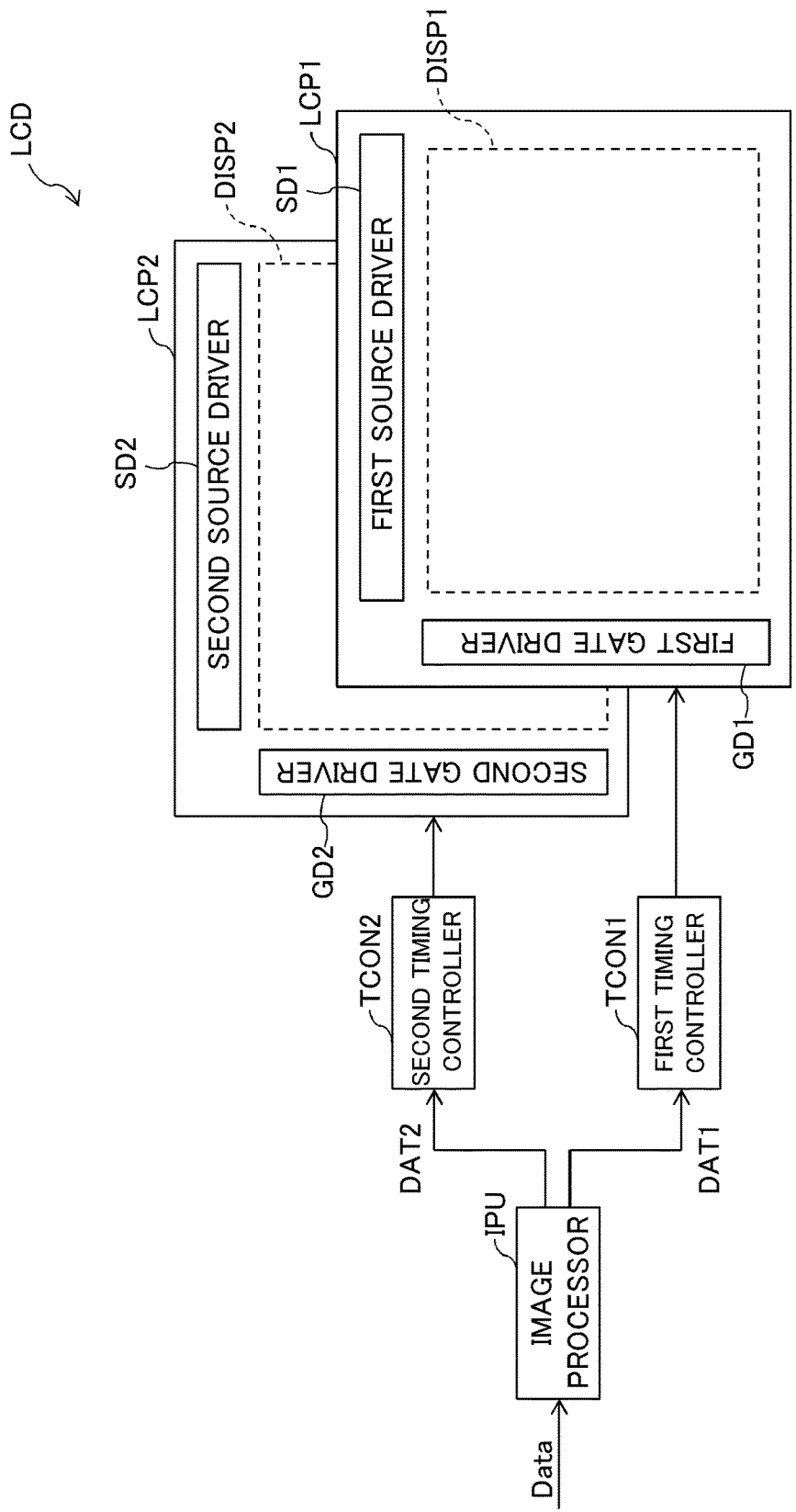

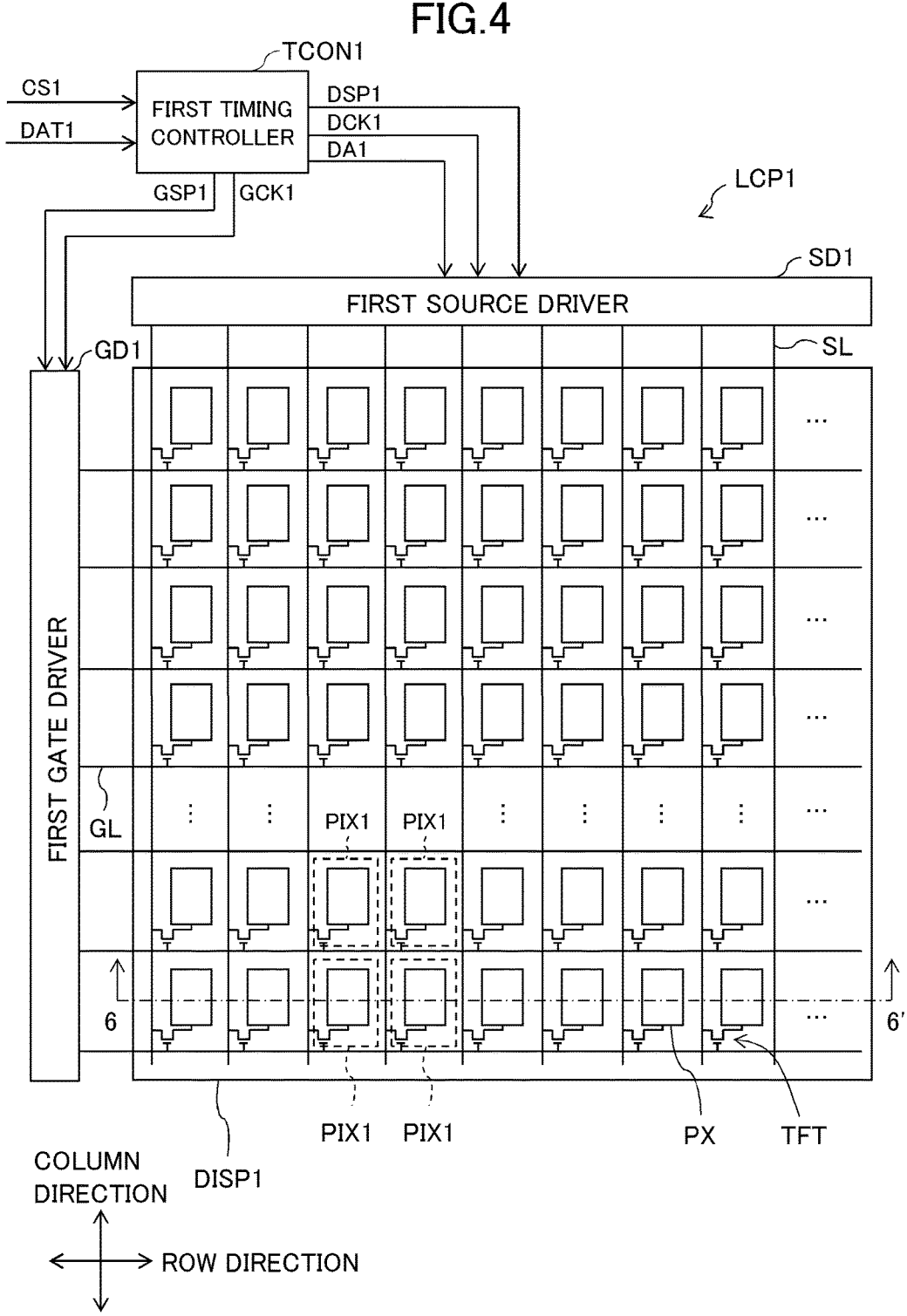

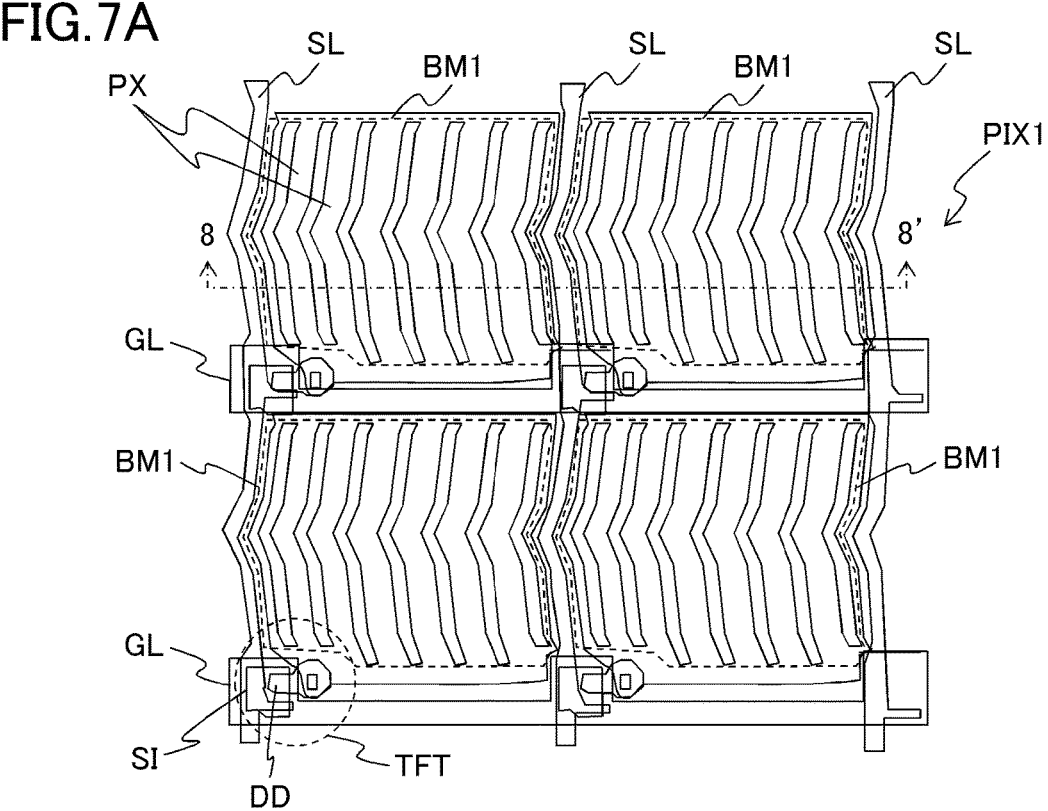
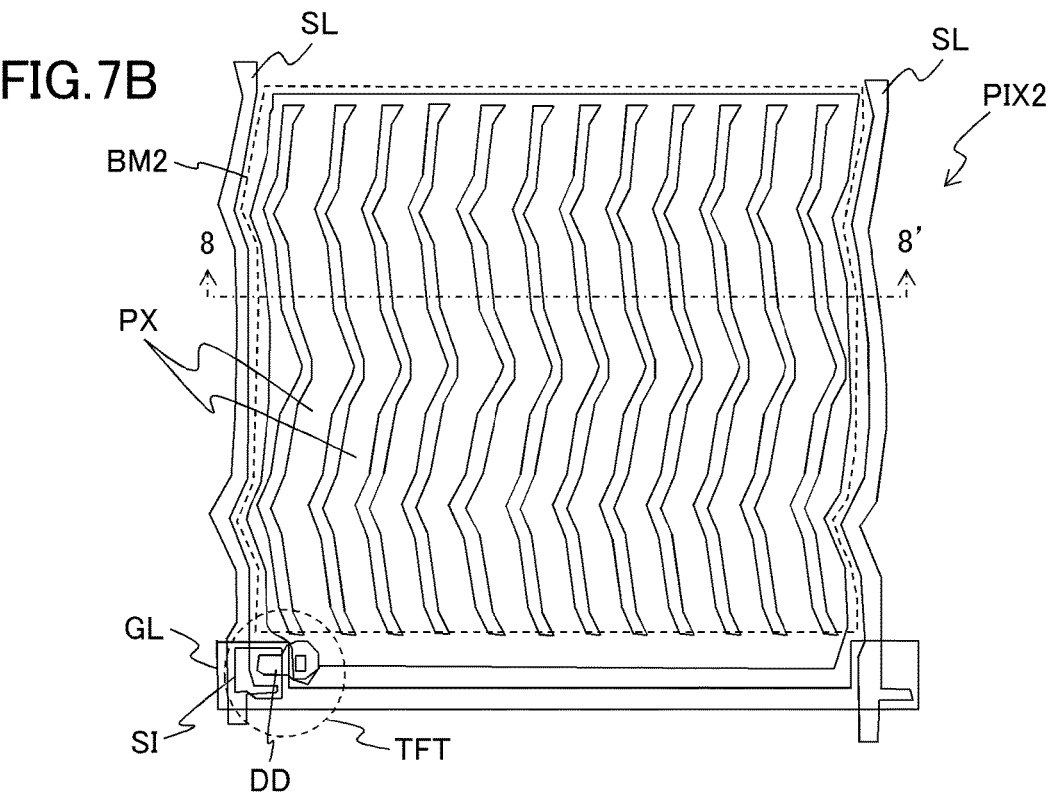

BACKLIGHT BEAM (BLUE)

BACKLIGHT BEAM (BLUE)

BACKLIGHT BEAM (RED)

BACKLIGHT BEAM (RED)

LIQUID CRYSTAL DISPLAY DEVICE

CROSS-REFERENCE TO RELATED APPLICATION

This application claims priority from Japanese application JP 2016-183832, filed Sep. 21, 2016. This Japanese application is incorporated herein by reference.

TECHNICAL FIELD

The present invention relates to a liquid crystal display device.

BACKGROUND

A technology, in which two display panels overlap each other and an image is displayed on each display panel based on an input video signal, is conventionally proposed to improve contrast of a liquid crystal display device (for example, see WO2007/040127). Specifically, for example, a color image is displayed on a front-side (observer-side) display panel in two display panels disposed back and forth, and a black-and-white image is displayed on a rear-side (backlight-side) display panel, thereby improving contrast. In the liquid crystal display device, to decrease the number of source drivers for a purpose of cost reduction, one pixel of a black-and-white image display panel is disposed with respect to three pixels (a red pixel, a green pixel, a blue pixel) of a color image display panel.

SUMMARY

In the case that a monochrome image is displayed on a normal liquid crystal display device constructed with one color image display panel, it is known that color reproducibility is degraded by leakage light from a pixel different from a pixel transmitting true color. For example, in the case that a blue monochrome image is displayed, light leakage occurs partially from an off-state red pixel and an off-state green pixel due to, for example, scattering, and the leakage light is mixed with blue light, there by degrading the color reproducibility of a blue image. Particularly, in the case that a low-luminance monochrome image is displayed, the color reproducibility is degraded because an influence of the leakage light increases. The same holds true for a liquid crystal display device disclosed in WO2007/040127. In the above-described liquid crystal display device, even if the monochrome image is displayed, a red pixel, a green pixel, and a blue pixel of the color image display panel are evenly irradiated with a backlight beam transmitted through a black-and-white image display panel. Therefore, the color reproducibility may be degraded due to the light leakage similarly to the normal liquid crystal display device.

The present disclosure is made in consideration of such a situation, and an object of the present disclosure is to improve the color reproducibility of the monochrome image in a liquid crystal display device in which the plurality of display panels overlap each other.

To solve the above problem, a liquid crystal display device according to a present disclosure in which a plurality of display panels are overlapping each other, comprises: a first display panel and a second display panel, which are overlapping each other; and a backlight disposed on rear surface sides of the first display panel and the second display panel, the backlight irradiating the first display panel and the second display panel with light beams in a plurality of colors while sequentially switching the light beams, wherein each of the first display panel and the second display panel includes a plurality of pixels each of which is defined by two source lines adjacent to each other and two gate lines adjacent to each other in plan view, and an area of the pixel included in the first display panel is smaller than an area of the pixel included in the second display panel.

In the liquid crystal display device according to the present disclosure, the plurality of pixels of the first display panel may include a first pixel and a second pixel, the plurality of pixel of the second display panel may include a third pixel, and the first pixel and the second pixel overlap the third pixel in plan view.

In the liquid crystal display device according to the present disclosure, a color filter layer may be not formed in either the first display panel or the second display panel.

In the liquid crystal display device according to the present disclosure, the number of the pixels disposed in the first display panel may be larger than the number of the pixels disposed in the second display panel.

In the liquid crystal display device according to the present disclosure, the second display panel may be disposed closer to the observer the first display panel is, a black matrix may be formed between the third pixel and a pixel adjacent to the third pixel in the second display panel, and the black matrix may not be formed between the first pixel and the second pixel in the first display panel.

In the liquid crystal display device according to the present disclosure, the plurality of pixels of the second display panel may be disposed denser toward a center of an image display region, and the plurality of pixels may be disposed coarser toward an end of the image display region.

BRIEF DESCRIPTION OF THE DRAWINGS

FIG. 2 is a view illustrating the schematic configuration of the liquid crystal display device according to the present exemplary embodiment;

FIG. 4 is a plan view illustrating a schematic configuration of a first display panel according to a first exemplary embodiment;

FIGS. 7A and 7B are plan views illustrating a relationship between pixels of the first display panel and pixels of the second display panel;

DETAILED DESCRIPTION

Hereinafter, exemplary embodiments of the present disclosure will be described with reference to the drawings. A liquid crystal display device of each exemplary embodiment described below includes a plurality of display panels that display images, a plurality of driving circuits (a plurality of source drivers and a plurality of gate drivers) that drive the display panels, a plurality of timing controllers that control the driving circuits, an image processor that performs image processing on an input video signal input from an outside and outputs image data to each of the timing controllers, and a backlight that irradiates the plurality of display panels with light from a rear surface side. There is no limitation to the number of display panels, but it is only necessary to provide at least two display panels. When viewed from the observer side, the plurality of display panels are disposed while overlapping each other in a front-back direction. An image is displayed on each of the display panels. Liquid crystal display device LCD including two display panels will be described below by way of example.

Figure 1:
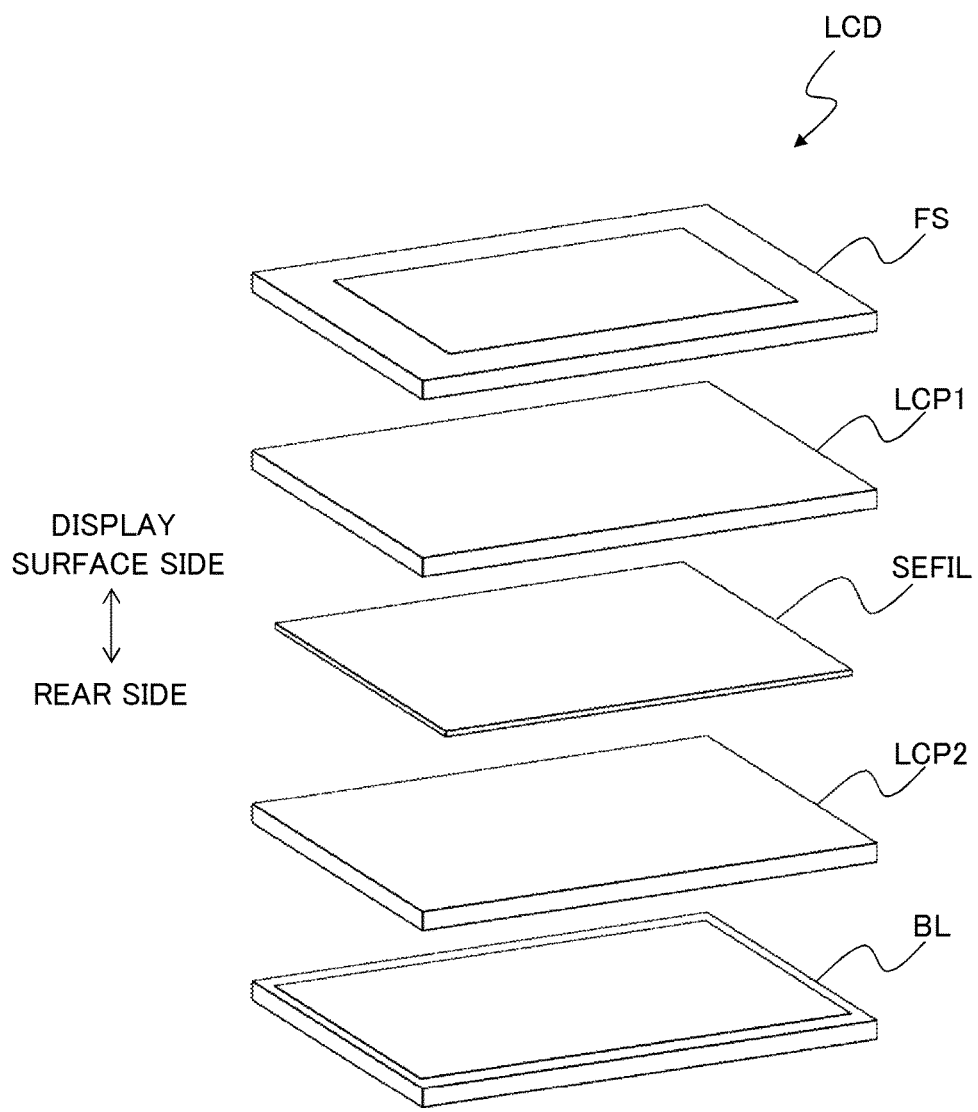
FIG. 1 is a perspective view illustrating a schematic configuration of a liquid crystal display device according to the present exemplary embodiment.

FIG. 1 is a perspective view illustrating a schematic configuration of liquid crystal display device LCD of the present exemplary embodiment. As illustrated in FIG. 1, liquid crystal display device LCD includes first display panel LCP1 which is disposed at a position (front side) closer to an observer, second display panel LCP2 which is disposed at a position (rear side) farther away from the observer than first display panel LCP1 is, adhesive layer SEFIL in which first display panel LCP1 and second display panel LCP2 adhere to each other, backlight BL disposed on the rear surface side of second display panel LCP2, and front chassis FS that covers first display panel LCP1 and second display panel LCP2 from the display surface side.

FIG. 2 is a view illustrating the schematic configuration of liquid crystal display device LCD of the present exemplary embodiment. As illustrated in FIG. 2, first display panel LCP1 includes first source driver SD1 and first gate driver GD1, and second display panel LCP2 includes second source driver SD2 and second gate driver GD2. In addition, liquid crystal display device LCD includes first timing controller TCON1 that controls first source driver SD1 and first gate driver GD1, second timing controller TCON2 that controls second source driver SD2 and second gate driver GD2, and image processor IPU that outputs image data to first timing controller TCON1 and second timing controller TCON2. First display panel LCP1 displays an image in first image display region DISP1 according to the input video signal, and second display panel LCP2 displays an image in second image display region DISP2 according to the input video signal. Image processor IPU receives input video signal Data transmitted from an external system (not illustrated), performs known image processing on input video signal Data, outputs first image data DAT1 to first timing controller TCON1, and outputs second image data DAT2 to second timing controller TCON2. Image processor IPU also outputs a control signal (not illustrated in FIG. 2) such as a synchronizing signal to first timing controller TCON1 and second timing controller TCON2.

Figure 3A:
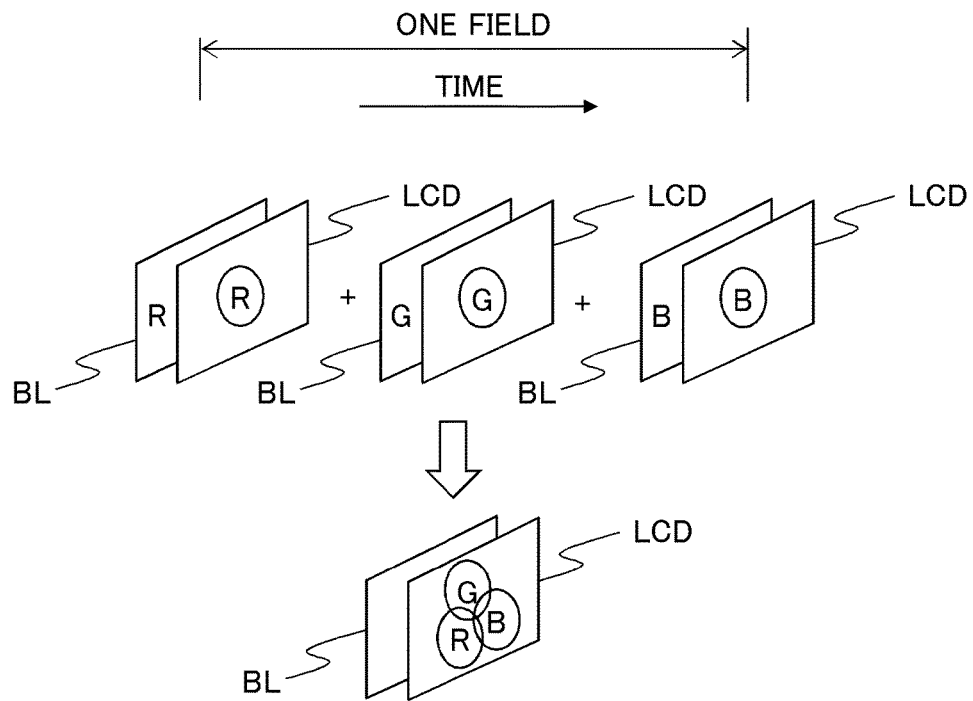
FIG. 3A is a view illustrating a field sequential color (FSC) drive method according to the present exemplary embodiment.
Figure 3B:
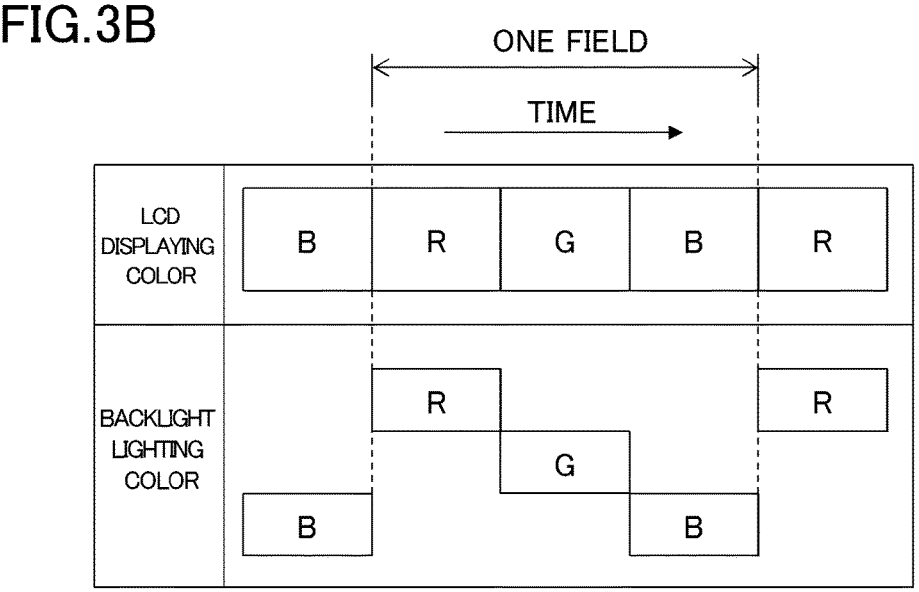
FIG. 3B is a view illustrating a field sequential color (FSC) drive method according to the present exemplary embodiment.

In liquid crystal display device LCD, the color image is displayed by what is called a field sequential color (FSC) drive method. In the field sequential color drive method, as illustrated in FIGS. 3A and 3B, for example, light-emitting diode (LED) backlights in three colors (red (R), green (G), and blue (B)) are sequentially switched and lit in one field with no use of a color filter, and the color image is recognized by switching screens in three colors of red, green, and blue. In field sequential color liquid crystal display device LCD, transmittance can be improved because a color filter layer is not formed.

First Exemplary Embodiment

Figure 5:
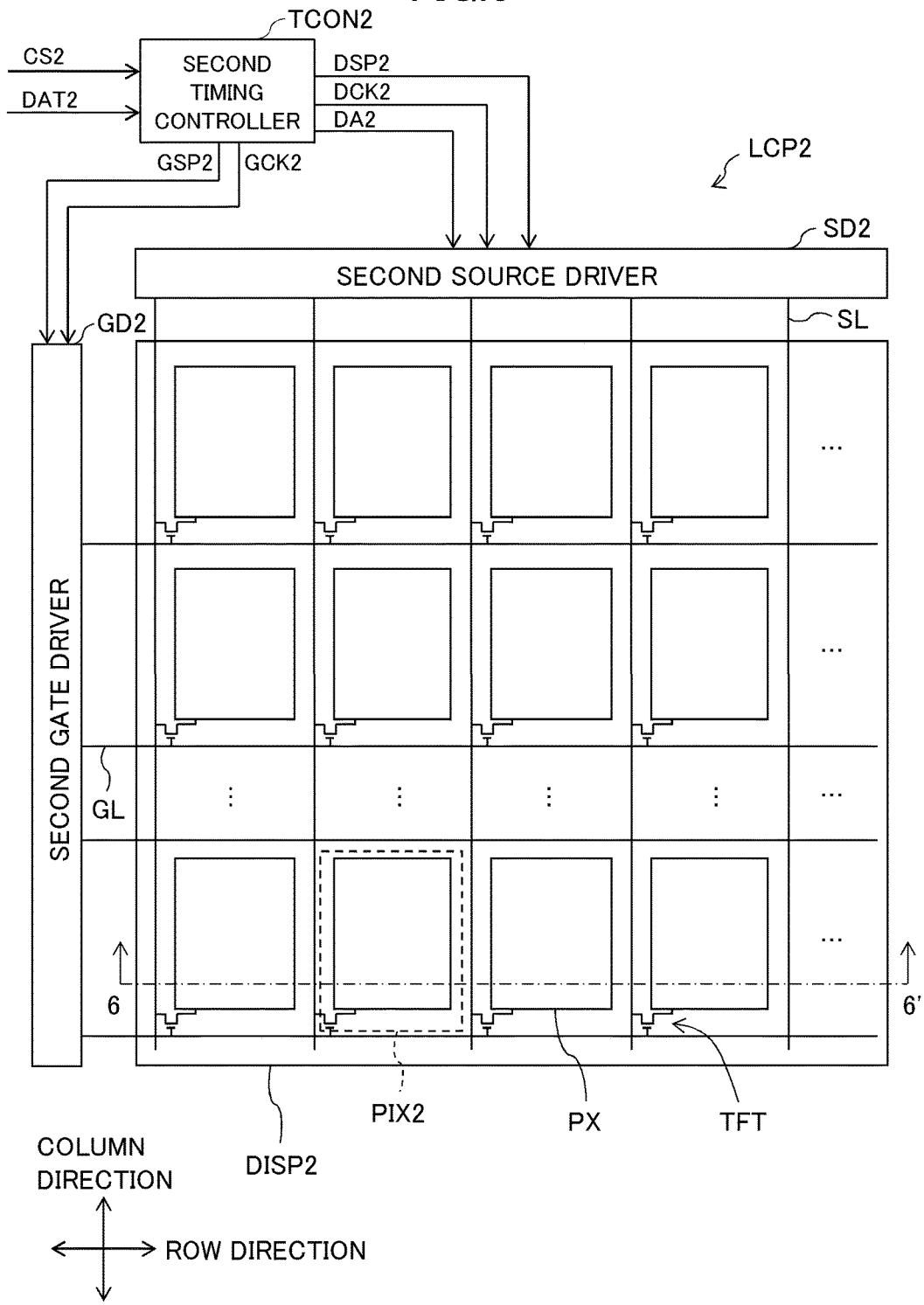
FIG. 5 is a plan view illustrating a schematic configuration of a second display panel according to the first exemplary embodiment.
Figure 6:
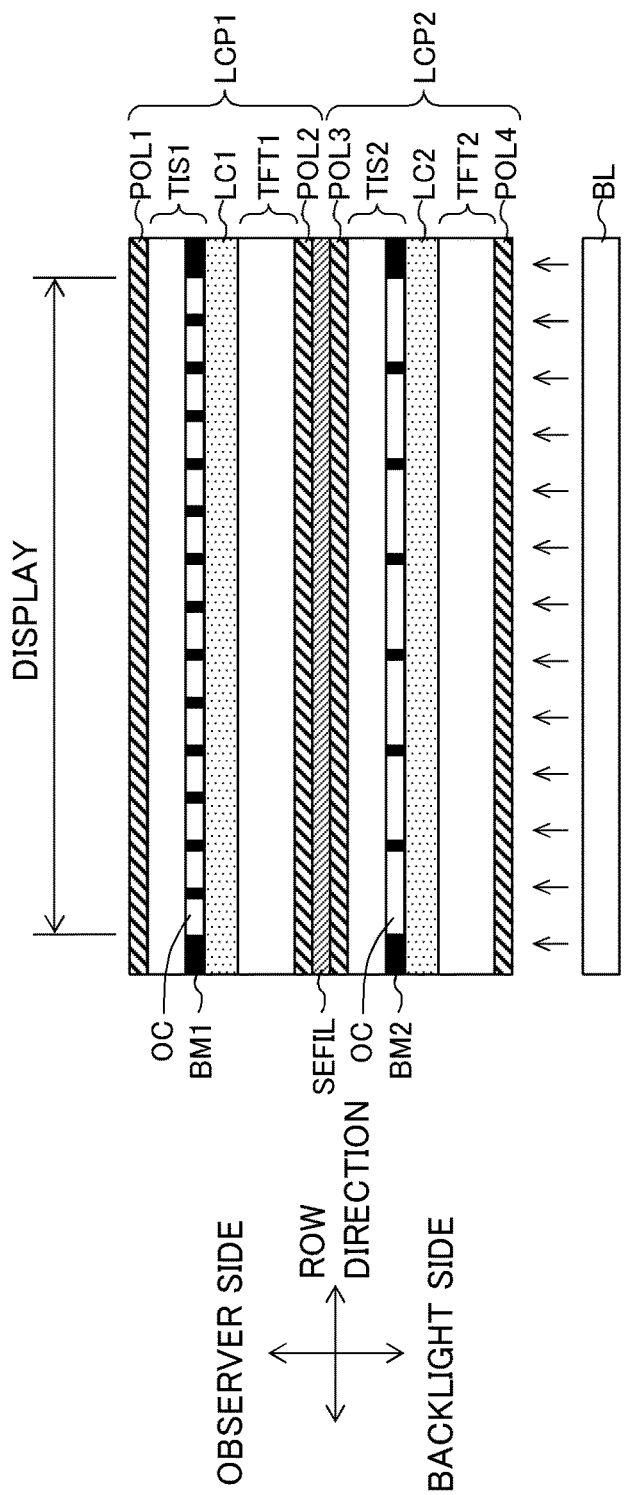
FIG. 6 is a sectional view taken along line 6-6' in FIGS. 4 and 5.

FIG. 4 is a plan view illustrating a schematic configuration of first display panel LCP1 according to a first exemplary embodiment, and FIG. 5 is a plan view illustrating a schematic configuration of second display panel LCP2 according to the first exemplary embodiment. FIG. 6 is a sectional view taken along line 6-6' in FIGS. 5 and 6.

The schematic configuration of first display panel LCP1 will be described with reference to FIGS. 4 and 6. As illustrated in FIG. 6, first display panel LCP1 includes thin film transistor substrate TFT1 disposed on the side of backlight BL, opposing substrate TIS1, which is disposed on the observer side while being opposite to thin film transistor substrate TFT1, and liquid crystal layer LC1 disposed between thin film transistor substrate TFT1 and opposing substrate TIS1. Polarizing plate POL2 is disposed on the side of backlight BL of first display panel LCP1, and polarizing plate POL1 is disposed on the observer side.

In thin film transistor substrate TFT1, as illustrated in FIG. 4, a plurality of source lines SL extending in a first direction (for example, a column direction), and a plurality of gate lines GL extending in a second direction (for example, a row direction) different from the first direction are formed, and thin film transistor TFT is formed close to an intersection between each of the plurality of source lines SL and each of the plurality of gate lines GL. In plan view of first display panel LCP1, a region surrounded by two source lines SL adjacent to each other and two gate lines GL adjacent to each other is defined as one pixel PIX1, and a plurality of pixels PIX1 are disposed in a matrix form (the row direction and the column direction). The plurality of source lines SL are disposed at equal intervals in the row direction, and the plurality of gate lines GL are disposed at equal intervals in the column direction. In thin film transistor substrate TFT1, pixel electrode PX is formed in each pixel PIX1, and one common electrode CT (see FIG. 8) common to the plurality of pixels PIX1 is formed. A source electrode constituting thin film transistor TFT is electrically connected to source line SL, drain electrode DD (see FIG. 7A) is electrically connected to pixel electrode PX through a contact hole, and a gate electrode is electrically connected to gate line GL.

As illustrated in FIG. 6, in opposing substrate TIS1, black matrix BM1 is formed at a position corresponding to a boundary of each pixel PIX1, namely, a position overlapping source line SL. The color filter layer (colored portion) is not formed in a region surrounded by black matrix BM1. For example, overcoat film OC is formed in the region.

First timing controller TCON1 has a known configuration. For example, based on first image data DAT1 and first control signal CS1 (such as a clock signal, a vertical synchronizing signal, and a horizontal synchronizing signal), which are output from image processor IPU, first timing controller TCON1 generates various timing signals (data start pulse DSP1, data clock DCK1, gate start pulse GSP1, and gate clock GCK1) to control first image data DA1 and drive of first source driver SD1 and first gate driver GD1 (see FIG. 4). First timing controller TCON1 outputs first image data DA1, data start pulse DSP1, and data clock DCK1 to first source driver SD1, and outputs gate start pulse GSP1 and gate clock GCK1 to first gate driver GD1.

First source driver SD1 outputs a data signal (data voltage) corresponding to first image data DA1 to source line SL based on data start pulse DSP1 and data clock DCK1. First gate driver GD1 outputs a gate signal (gate voltage) to gate lines GL based on gate start pulse GSP1 and gate clock GCK1.

First source driver SD1 supplies the data voltage to source line SL, and first gate driver GD1 supplies the gate voltage to gate line GL. Common voltage Vcom is supplied from a common driver (not illustrated) to common electrode CT. When the gate voltage (gate-on voltage) is supplied to gate line GL, thin film transistor TFT connected to gate line GL is turned on, and the data voltage is supplied to pixel electrode PX through source line SL connected to thin film transistor TFT. An electric field is generated by a difference between the data voltage supplied to pixel electrode PX and common voltage Vcom supplied to common electrode CT. The liquid crystal is driven by the electric field, and transmittance of the light emitted from backlight BL is controlled, thereby displaying an image.

The schematic configuration of second display panel LCP2 will be described with reference to FIGS. 5 and 6. As illustrated in FIG. 6, second display panel LCP2 includes thin film transistor substrate TFT2 disposed on the side of backlight BL, opposing substrate TIS2, which is disposed on the observer side while being opposite to thin film transistor substrate TFT2, and liquid crystal layer LC2 disposed between thin film transistor substrate TFT2 and opposing substrate TIS2. Polarizing plate POL4 is disposed on the side of backlight BL of second display panel LCP2, and polarizing plate POL3 is disposed on the observer side of of second display panel LCP2. Adhesive layer SEFIL is disposed between polarizing plate POL2 of first display panel LCP1 and polarizing plate POL3 of second display panel LCP2.

In thin film transistor substrate TFT2, as illustrated in FIG. 5, a plurality of source lines SL extending in the column direction, and a plurality of gate lines GL extending in the row direction are formed, and thin film transistor TFT is formed close to the intersection between each of the plurality of source lines SL and each of the plurality of gate lines GL. In plan view of second display panel LCP2, a region surrounded by two source lines SL adjacent to each other and two gate lines GL adjacent to each other is defined as one pixel PIX2, and a plurality of pixels PIX2 are disposed in a matrix form (the row direction and the column direction). The plurality of gate lines GL are disposed at equal intervals in the column direction. In thin film transistor substrate TFT2, pixel electrode PX is formed in each pixel PIX2, and one common electrode CT (see FIG. 8) common to the plurality of pixels PIX2 is formed. A source electrode constituting thin film transistor TFT is electrically connected to source line SL, drain electrode DD (see FIG. 7B) is electrically connected to pixel electrode PX through a contact hole, and a gate electrode is electrically connected to gate line GL.

As illustrated in FIG. 6, in opposing substrate TIS2, black matrix BM2 is formed at a position corresponding to a boundary of each pixel PIX2, namely, a position overlapping source line SL in plan view. The color filter layer (colored portion) is not formed in a region surrounded by black matrix BM2. For example, overcoat film OC is formed in the region.

Second timing controller TCON2 has a known configuration. For example, based on second image data DAT2 and second control signal CS2 (such as a clock signal, a vertical synchronizing signal, and a horizontal synchronizing signal), which are output from image processor IPU, second timing controller TCON2 generates various timing signals (data start pulse DSP2, data clock DCK2, gate start pulse GSP2, and gate clock GCK2) to control second image data DA2 and drive of second source driver SD2 and second gate driver GD2 (see FIG. 5). Second timing controller TCON2 outputs second image data DA2, data start pulse DSP2, and data clock DCK2 to second source driver SD2, and outputs gate start pulse GSP2 and gate clock GCK2 to second gate driver GD2.

Second source driver SD2 outputs the data voltage corresponding to second image data DA2 to source line SL based on data start pulse DSP2 and data clock DCK2. Second gate driver GD2 outputs the gate voltage to gate lines GL based on gate start pulse GSP2 and gate clock GCK2.

Second source driver SD2 supplies the data voltage to each source line SL, and second gate driver GD2 supplies the gate voltage to each gate line GL. The common driver supplies common voltage Vcom to common electrode CT. When the gate voltage (gate-on voltage) is supplied to gate line GL, thin film transistor TFT connected to gate line GL is turned on, and the data voltage is supplied to pixel electrode PX through source line SL connected to thin film transistor TFT. An electric field is generated by a difference between the data voltage supplied to pixel electrode PX and common voltage Vcom supplied to common electrode CT. The liquid crystal is driven by the electric field, and transmittance of the light emitted from backlight BL is controlled, thereby displaying an image.

Liquid crystal display device LCD is configured such that the number of pixels PIX2 of second display panel LCP2 is smaller than the number of pixels PIX1 of first display panel LCP1. That is to say, first display panel LCP1 is a high resolution panel and second display panel LCP2 is a low resolution panel. For example, liquid crystal display device LCD is constructed such that four pixels PIX1 of first display panel LCP1 and one pixel PIX2 of second display panel LCP2 correspond to each other (overlap each other in plan view).

FIGS. 7A and 7B are plan views illustrating a relationship between four pixel PIX1 of first display panel LCP1 and one pixel PIX2 of second display panel LCP2, which overlap each other. In the case that pixels PIX1 of first display panel LCP1 are equal to each other in an area (size), the area of one pixel PIX2 of second display panel LCP2 is quadruple the area of one pixel PIX1 of first display panel LCP1. The number of pixel PIX1 of first display panel LCP1 which overlaps one pixel PIX2 of second display panel LCP2 is not limited and had better be plural. FIGS. 7A and 7B illustrate semiconductor layer SI and drain electrode DD, which constitute thin film transistor TFT. As illustrated in FIGS. 7A and 7B, a slit may be formed in pixel electrode PX.

Figure 8:
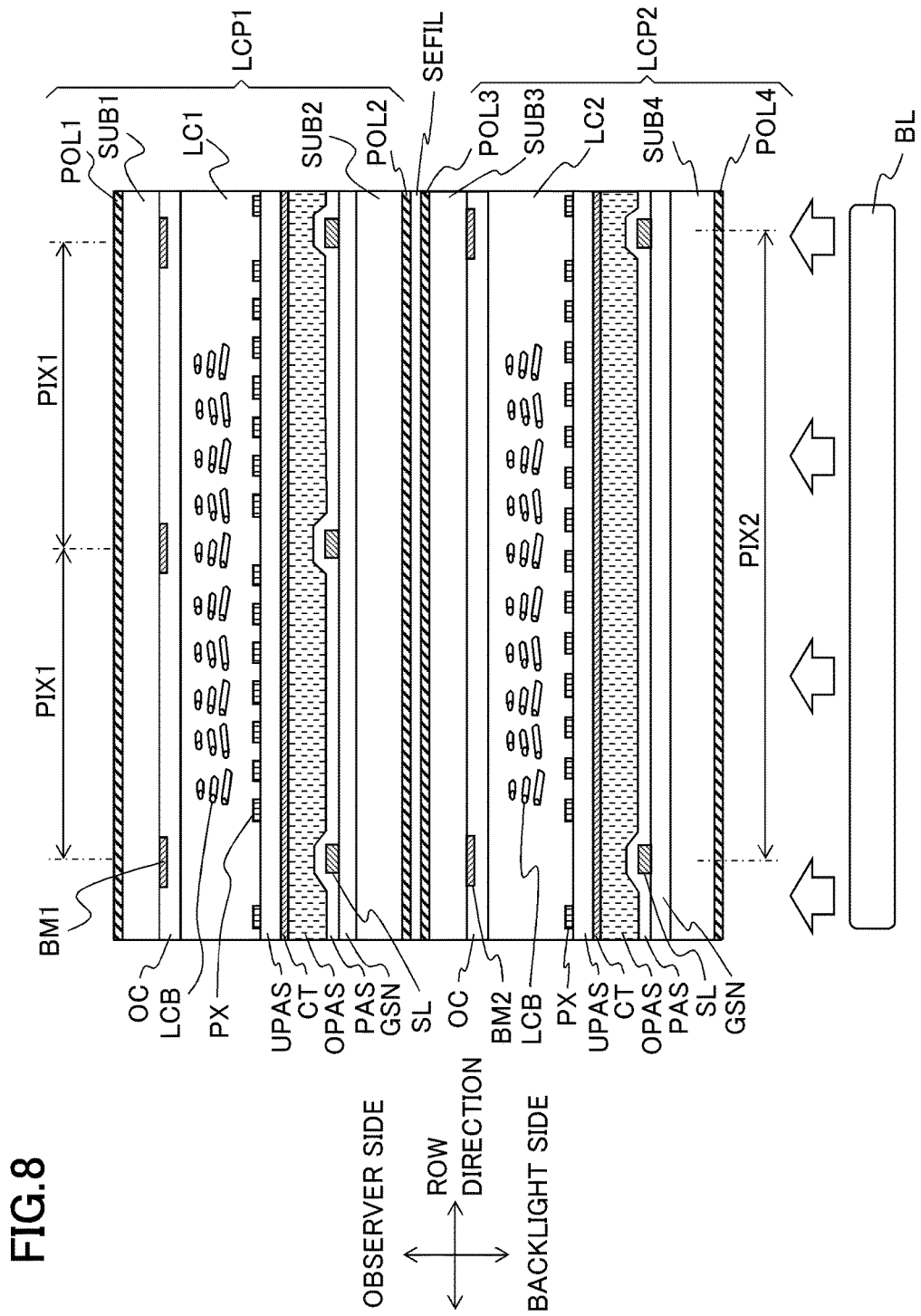
FIG. 8 is a sectional view taken along line 8-8' in FIGS. 7A and 7B.

FIG. 8 is a sectional view taken along line 8-8' in FIGS. 7A and 7B. Sectional structures of pixels PIX1 and PIX2 will be described below with reference to FIG. 8.

In thin film transistor substrate TFT1 constituting pixel PIX1 of first display panel LCP1, gate line GL (see FIG. 7A) is formed on transparent substrate SUB2 (glass substrate), and gate insulating film GSN is formed so as to cover gate line GL. Source lines SL are formed on gate insulating film GSN, and protective film PAS and organic film OPAS are formed so as to cover source lines SL. Common electrode CT is formed on organic film OPAS, and protective film UPAS is formed so as to cover common electrode CT. Pixel electrodes PX are formed on protective film UPAS, and an alignment film (not illustrated) is formed so as to cover pixel electrodes PX. Source lines SL are disposed at equal intervals in the row direction. In opposing substrate TIS1, black matrix BM1 and overcoat film OC are formed on transparent substrate SUB1 (glass substrate). An alignment film (not illustrated) is formed on overcoat film OC.

In pixel PIX2 of second display panel LCP2, source line SL and black matrix BM2 are formed so as to overlap source line SL and black matrix BM1 of first display panel LCP1. In the row direction, an interval between source lines SL of second display panel LCP2 is double an interval between source lines SL of first display panel LCP1, and an interval between black matrices BM2 of second display panel LCP2 is double an interval between black matrices BM1 of first display panel LCP1. As can be seen from FIGS. 7A and 7B, in the column direction, an interval between gate lines GL of second display panel LCP2 is double an interval between gate lines GL of first display panel LCP1, and an interval between black matrices BM2 of second display panel LCP2 is double an interval between black matrices BM1 of first display panel LCP1. Another pixel structure of pixel PIX2 of second display panel LCP2 is identical to the pixel structure of pixel PIX1 of first display panel LCP1.

Figure 9A:
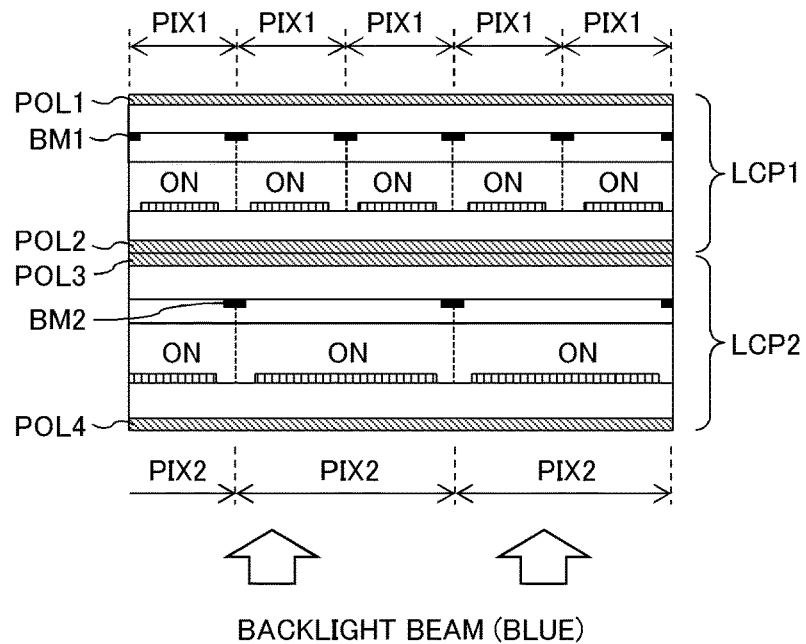
FIG. 9A is a schematic view illustrating an example of a displayed image of the liquid crystal display device according to the first exemplary embodiment.
Figure 9B:
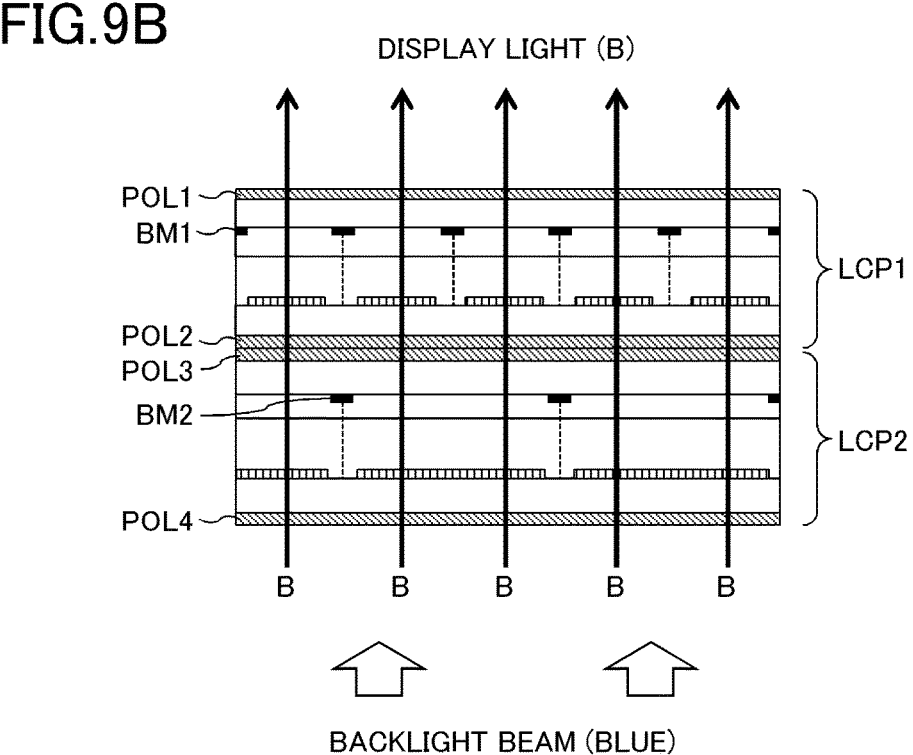
FIG. 9B is a schematic view illustrating an example of a displayed image of the liquid crystal display device according to the first exemplary embodiment.
Figure 10A:
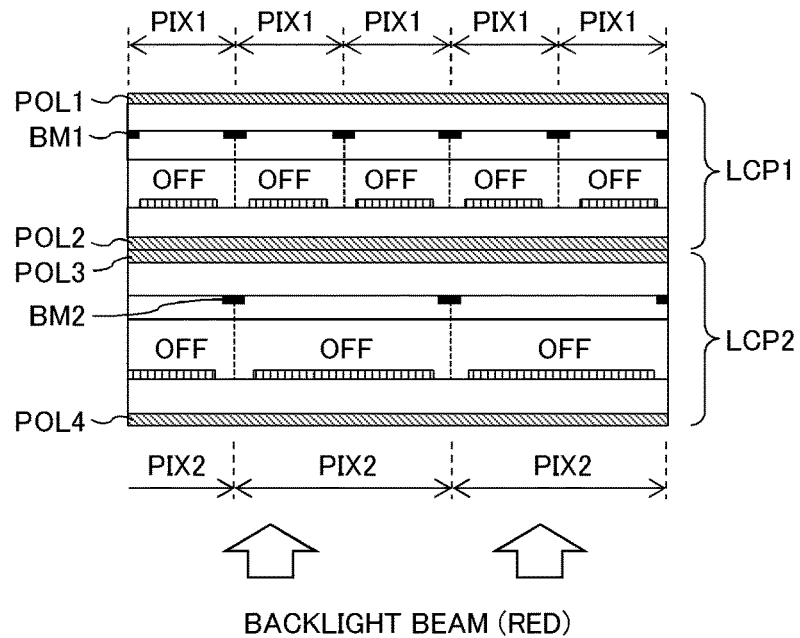
FIG. 10A is a schematic view illustrating another example of a displayed image of the liquid crystal display device according to the first exemplary embodiment.
Figure 10B:
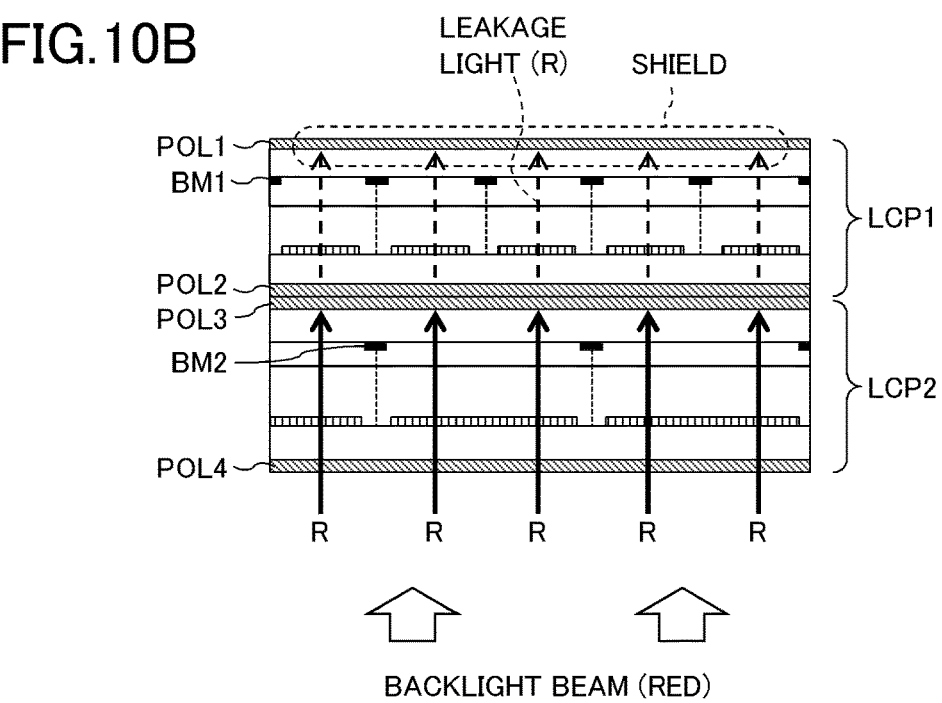
FIG. 10B is a schematic view illustrating another example of a displayed image of the liquid crystal display device according to the first exemplary embodiment.
Figure 11A:
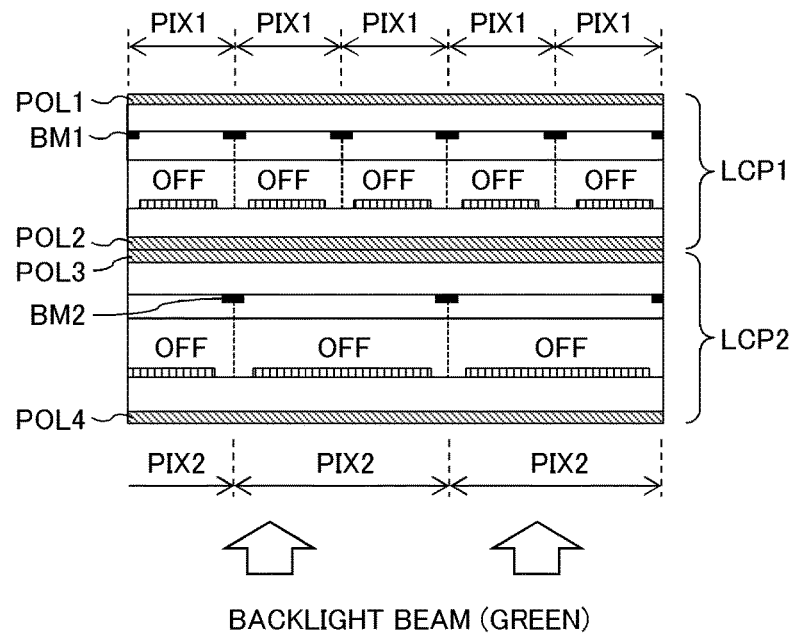
FIG. 11A is a schematic view illustrating another example of a displayed image of the liquid crystal display device according to the first exemplary embodiment.
Figure 11B:
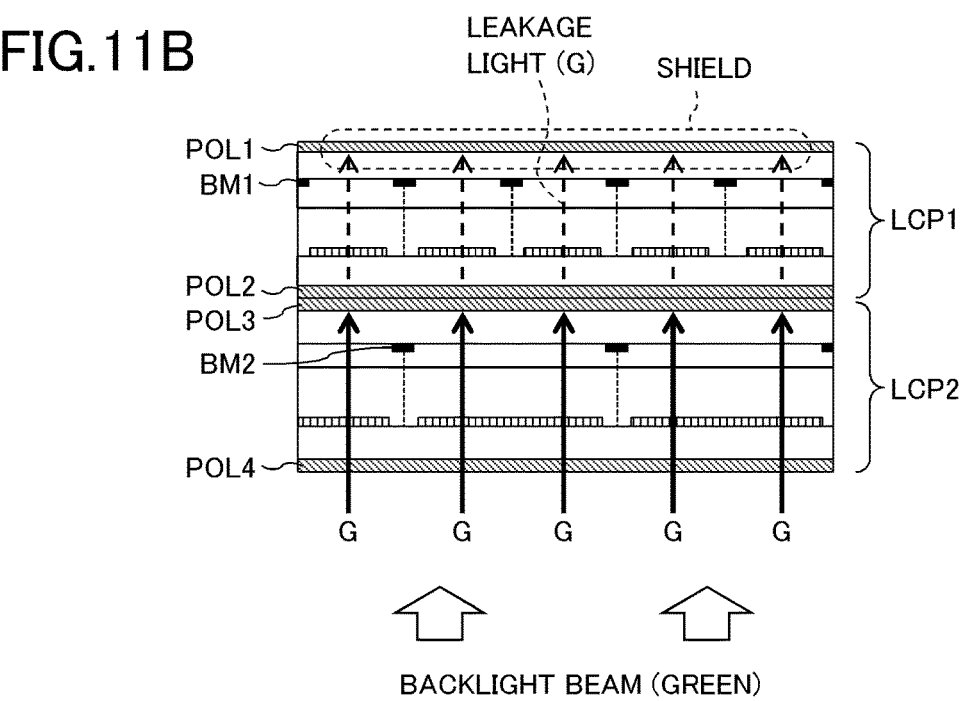
FIG. 11B is a schematic view illustrating another example of a displayed image of the liquid crystal display device according to the first exemplary embodiment.

As described above, four pixels PIX1 of first display panel LCP1 and one pixel PIX2 of second display panel LCP2 are disposed while overlapping each other. In the case that a blue monochrome image is displayed in the above configuration, at time t1, as illustrated in FIGS. 9A and 9B, the blue LED backlight is lit, and all pixels PIX1 and pixels PIX2 are put into an on state. This enables the display of the blue image. At time t2 after time t1, as illustrated in FIGS. 10A and 10B, the red LED backlight is lit, and all pixels PIX1 and pixels PIX2 are put into an off state. At time t3 after time t2, as illustrated in FIGS. 11A and 11B, the green LED backlight is lit, and all pixels PIX1 and pixels PIX2 are put into the off state. In the above configuration, because all pixels PIX1 of first display panel LCP1 and all pixels PIX2 of second display panel LCP2 are put into the off state at time t2, polarizing plate POL1 of first display panel LCP1 can shield the leakage light (R) even if the leakage of the red light occurs in second display panel LCP2. Similarly, because all pixels PIX1 of first display panel LCP1 and all pixels PIX2 of second display panel LCP2 are put into the off state at time t3, polarizing plate POL1 of first display panel LCP1 can shield the leakage light (G) even if the leakage of the green light occurs in second display panel LCP2. Therefore, the leakage of the red light and green light is reduced compared with the conventional configuration, so that the color reproducibility of the blue monochrome image can be improved. The same holds true for monochrome images of other colors. Particularly, a color reproducibility improvement effect is increased when a low-luminance monochrome image is displayed.

Figure 12:
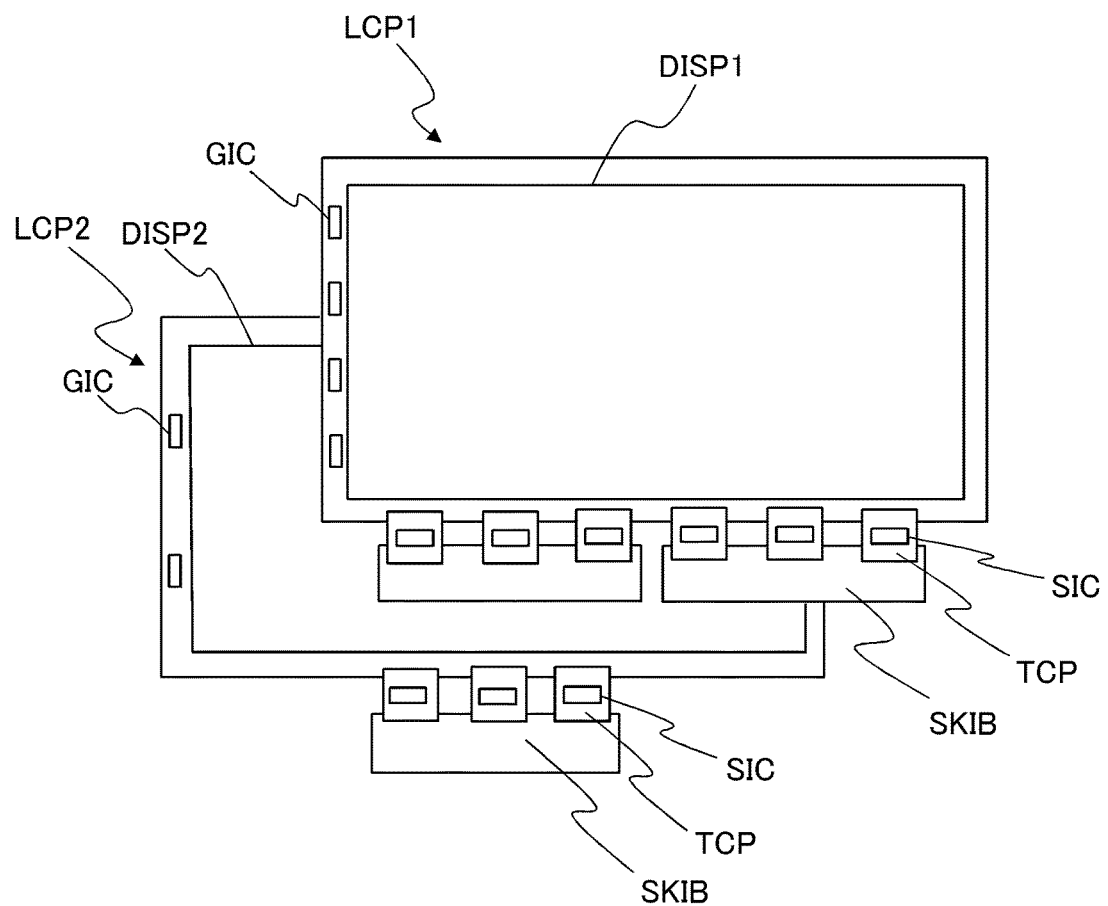
FIG. 12 is a view illustrating configurations of drivers of the first display panel and the second display panel according to the first exemplary embodiment.

In the above configuration, a scale of second source driver SD2 and a scale of second gate driver GD2 of second display panel LCP2 can be reduced. FIG. 12 is a view illustrating configurations of drivers of first display panel LCP1 and second display panel LCP2. Six tape carrier packages (TCPs) in each of which the source driver IC (SIC) is mounted are connected to first display panel LCP1, and each TCP is connected to source printed board SKIB. On the other hand, three TCPs in each of which the source driver IC (SIC) is mounted are connected to second display panel LCP2, and each TCP is connected to source printed board SKIB. four gate drive ICs are mounted on first display panel LCP1, on the other hand two gate drive ICs are mounted on second display panel LCP2. Thus, the cost of liquid crystal display device LCD can be reduced because the number of source driver ICs and gate driver ICs of second display panel LCP2 can be decreased compared with first display panel LCP1.

Second Exemplary Embodiment

A second exemplary embodiment of the present disclosure will be described below with reference to the drawings. For convenience, the same component as that of the first exemplary embodiment is designated by the same numeral, and the description will be omitted. In the second exemplary embodiment, the term defined in the first exemplary embodiment is used according to the definition of the first exemplary embodiment unless otherwise noted. The same holds true for the following exemplary embodiments.

Figure 13:
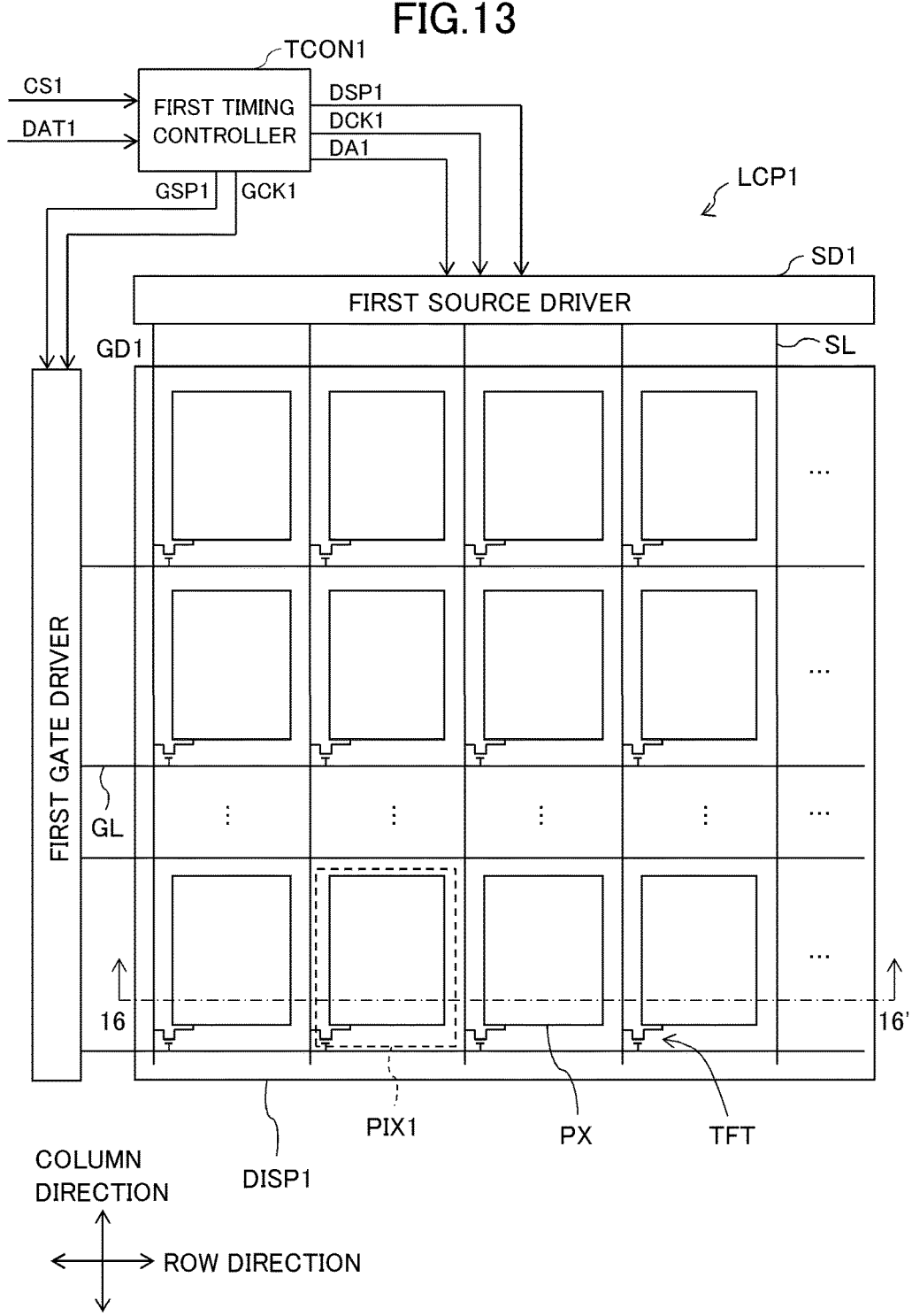
FIG. 13 is a plan view illustrating a schematic configuration of a first display panel according to a second exemplary embodiment.
Figure 14:
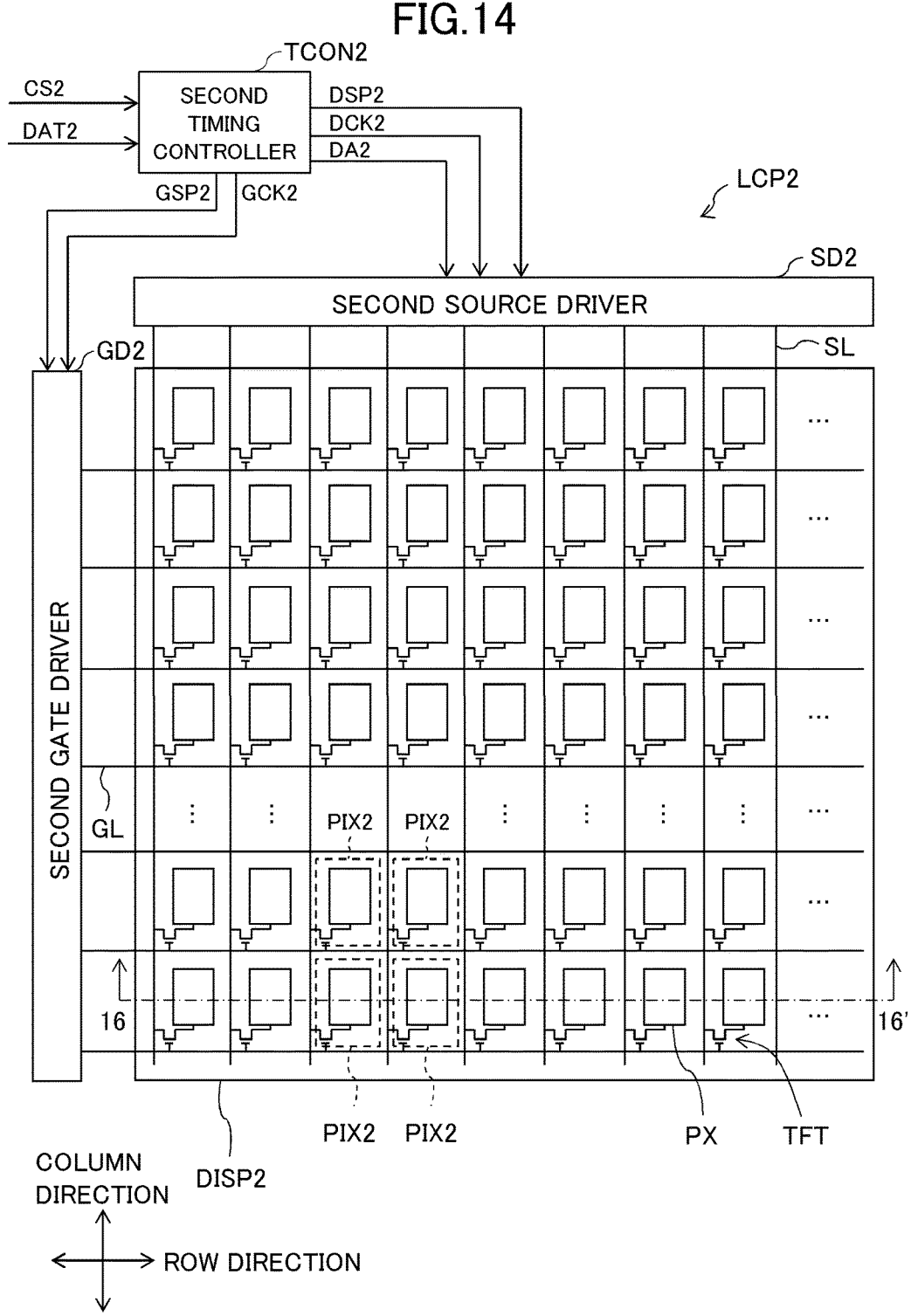
FIG. 14 is a plan view illustrating a schematic configuration of a second display panel according to the second exemplary embodiment.

FIG. 13 is a plan view illustrating a schematic configuration of first display panel LCP1 according to the second exemplary embodiment, and FIG. 14 is a plan view illustrating a schematic configuration of second display panel LCP2 according to the second exemplary embodiment.

In liquid crystal display device LCD of the second exemplary embodiment differs from liquid crystal display device LCD of the first exemplary embodiment in that the configurations of first display panel LCP1 and second display panel LCP2 of liquid crystal display device LCD are inverted. Specifically, as illustrated in FIGS. 13 and 14, liquid crystal display device LCD of the second exemplary embodiment is configured such that the number of pixels PIX1 of first display panel LCP1 is smaller than the number of pixels PIX2 of second display panel LCP2. That is, in liquid crystal display device LCD of the second exemplary embodiment, first display panel LCP1 has a configuration of a low-resolution panel, and second display panel LCP2 has a configuration of a high-resolution panel. For example, in liquid crystal display device LCD of the second exemplary embodiment, one pixel PIX1 of first display panel LCP1 and four pixels PIX2 of second display panel LCP2 are configured so as to correspond each other (overlap each other in plan view).

Figure 15A:
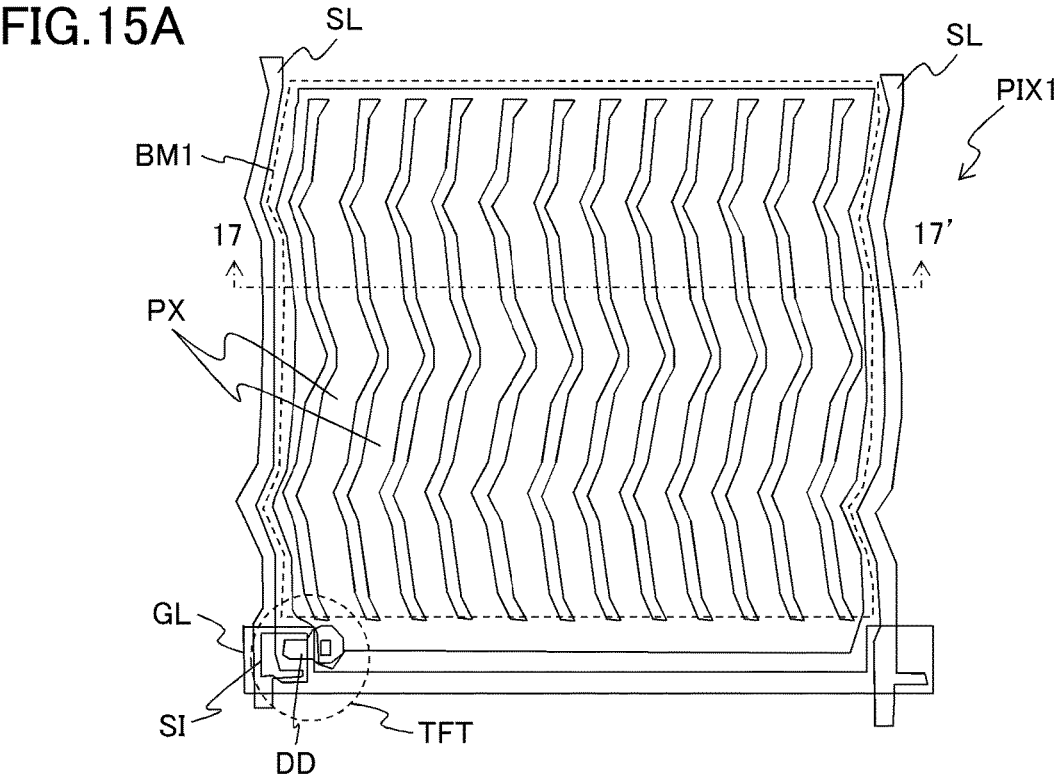
FIGS. 15A and 15B are plan views illustrating a relationship between pixels of the first display panel and pixels of the second display panel.
Figure 15B:
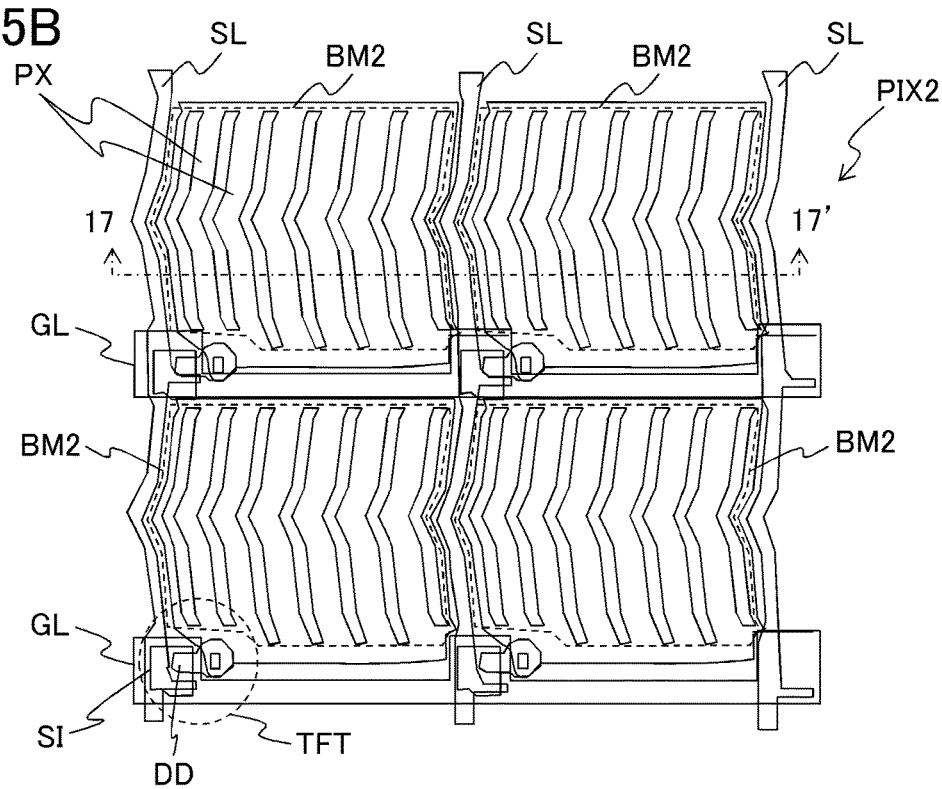

FIGS. 15A and 15B are plan views illustrating specific configurations of one pixel PIX1 of first display panel LCP1 and four pixels PIX2 of second display panel LCP2, which overlap each other. In the case that areas (sizes) of pixels PIX2 of second display panel LCP2 are equal to each other, an area of one pixel PIX1 of first display panel LCP1 is quadruple the area of one pixel PIX2 of second display panel LCP2.

Figure 16:
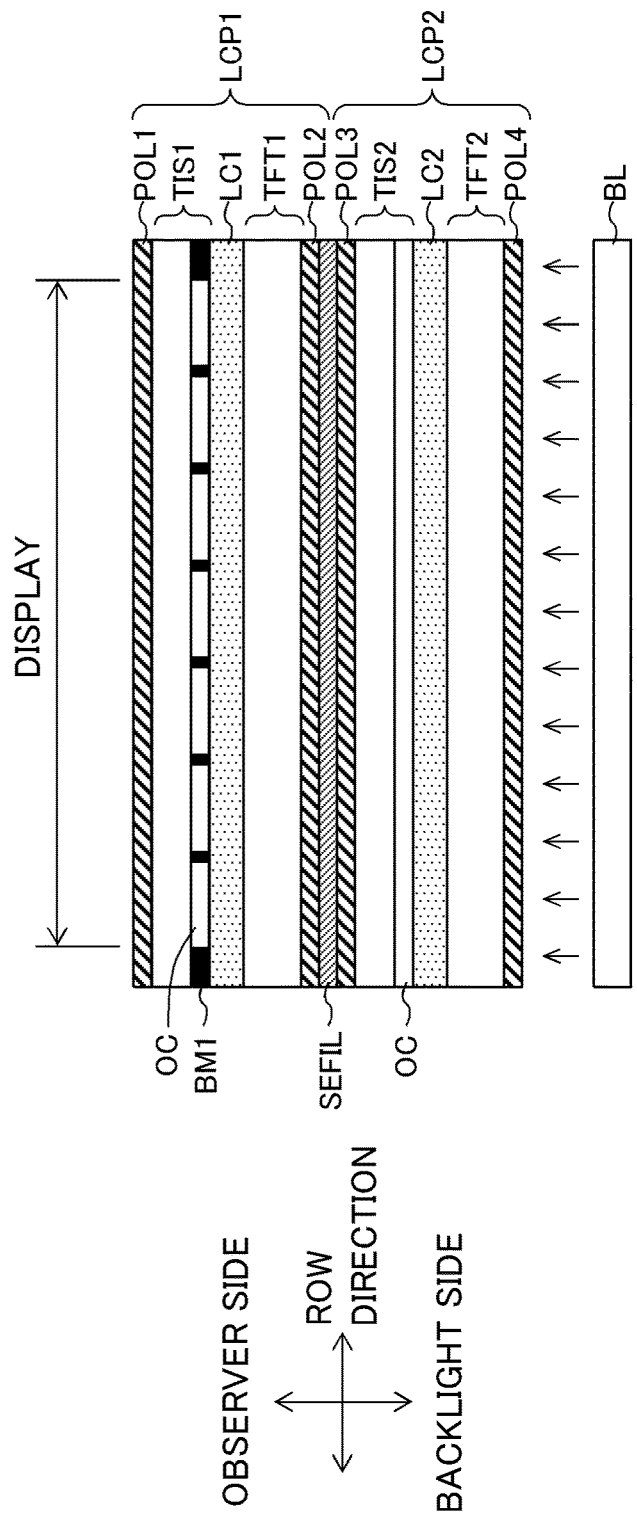
FIG. 16 is a sectional view taken along line 16-16' in FIGS. 13 and 14.
Figure 17:
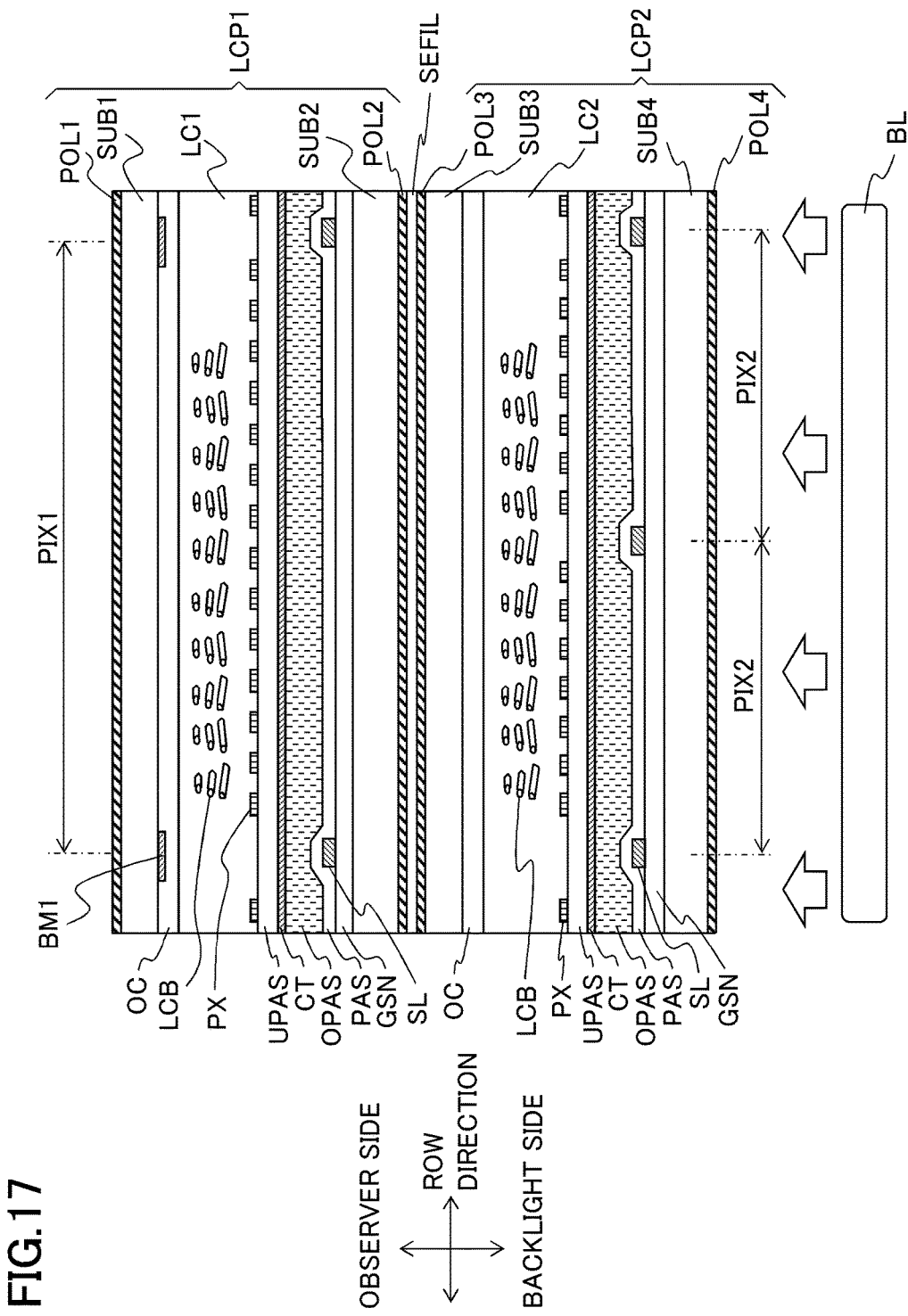
FIG. 17 is a sectional view taken along line 17-17' in FIGS. 15A and 15B.

FIG. 16 is a sectional view taken along line 16-16' in FIGS. 13 and 14, and FIG. 17 is a sectional view taken along line 17-17' in FIGS. 15A and 15B.

As illustrated in FIGS. 16 and 17, in pixel PIX1 of first display panel LCP1, source line SL and black matrix BM1 are formed so as to overlap source line SL of second display panel LCP2. In the row direction, the interval between source lines SL of first display panel LCP1 and the interval between black matrices BM1 of first display panel LCP1 are double the interval between source lines SL of second display panel LCP2. Black matrix BM1 is formed in first display panel LCP1 while no black matrix is formed in second display panel LCP2. Other pixel structures of first display panel LCP1 and second display panel LCP2 are identical to the pixel structure of the first exemplary embodiment.

Figure 18:
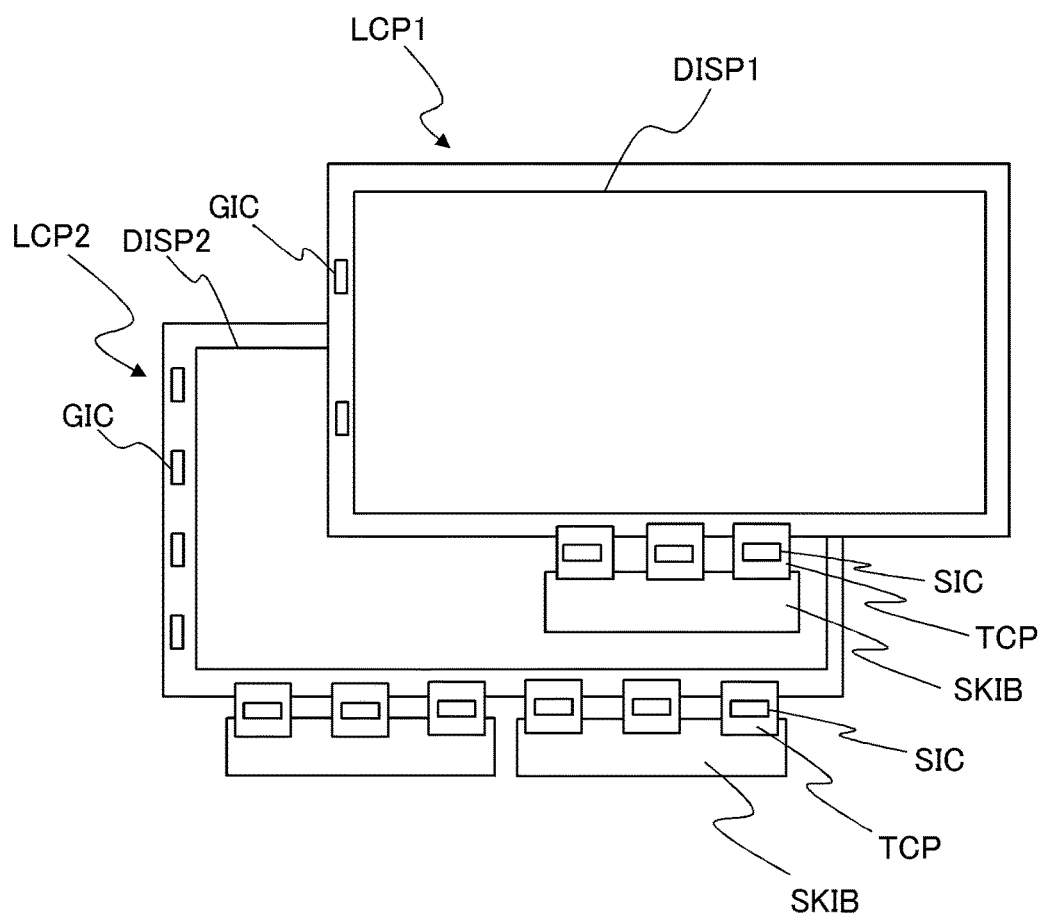
FIG. 18 is a view illustrating configurations of drivers of the first display panel and the second display panel according to the second exemplary embodiment.

In the above configuration, similarly to the first exemplary embodiment (see FIGS. 9 to 11), polarizing plate POL1 of first display panel LCP1 can shield the leakage light (R) even if the leakage of the red light occurs in second display panel LCP2, and polarizing plate POL1 of first display panel LCP1 can shield the leakage light (G) even if the leakage of the green light occurs in second display panel LCP2. Therefore, the leakage of the red light and green light is reduced compared with the conventional configuration, so that the color reproducibility of the blue monochrome image can be improved. The same holds true for monochrome images of other colors. In the above configuration, the cost of liquid crystal display device LCD can be reduced because the numbers of source driver ICs and gate driver ICs of first display panel LCP1 can be decreased compared with second display panel LCP2 as illustrated in FIG. 18.

Figure 19A:
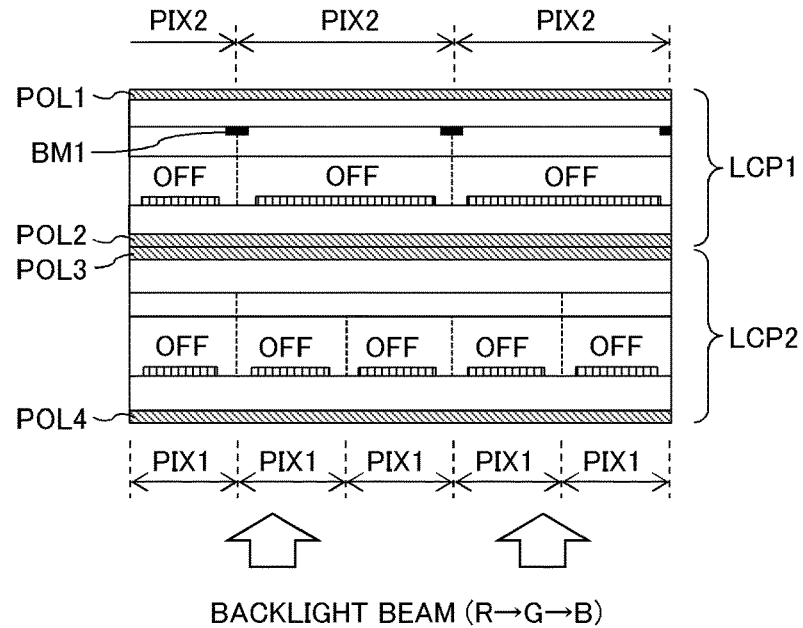
FIG. 19A is a schematic view illustrating an example of a displayed image of the liquid crystal display device according to the second exemplary embodiment.
Figure 19B:
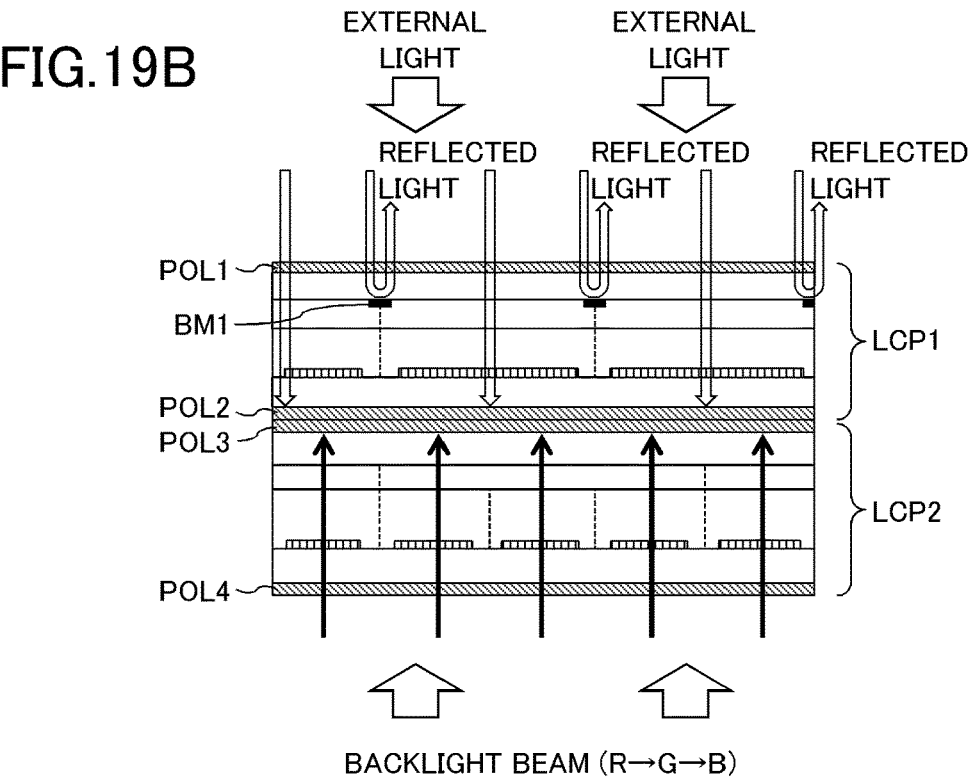
FIG. 19B is a schematic view illustrating an example of a displayed image of the liquid crystal display device according to the second exemplary embodiment.

Additionally, in the above configuration, an external light amount reflected by black matrix BM1 and source line SL is decreased as illustrated in FIGS. 19A and 19B because the areas of black matrix BM1 and source line SL, which are formed in first display panel LCP1 of the second exemplary embodiment, are smaller than the areas of black matrix BM1 and source line SL, which are formed in first display panel LCP1 of the first exemplary embodiment. Therefore, the degradation of display quality due to the reflection can be suppressed, particularly, in the case that the black image is displayed. Because the external light incident on the first display panel LCP1 is absorbed by polarizing plate POL2 and like, incoming of the external light into second display panel LCP2 can be suppressed. In second display panel LCP2, necessity of the black matrix is eliminated because the reflection of the external light needs not to be considered. Therefore, a numerical aperture and transmittance can be improved in the pixel of liquid crystal display device LCD.

Figure 20:
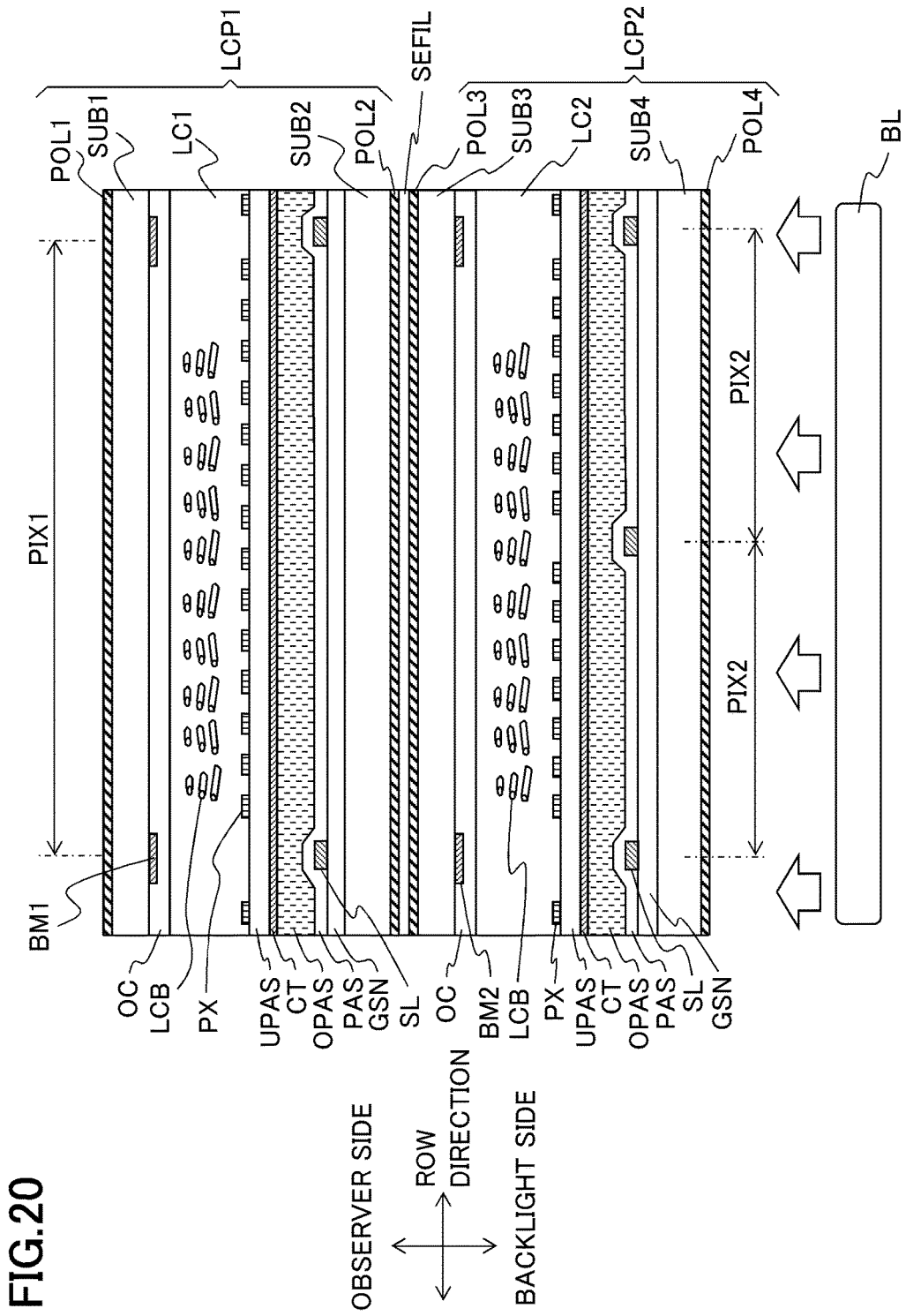
FIG. 20 illustrates a variation of the liquid crystal display device according to the second exemplary embodiment.

Second display panel LCP2 of the second exemplary embodiment is not limited to the above configuration. For example, as illustrated in FIG. 20, black matrix BM2 of second display panel LCP2 may be formed at a position where black matrix BM2 overlaps black matrix BM1 of first display panel LCP1 in plan view. That is, in second display panel LCP2, black matrices BM2 are formed on both sides of a plurality of adjacent pixels PIX2 (in FIG. 20, two pixels PIX2) overlapping one pixel PIX1 of first display panel LCP1 in plan view, but black matrix BM2 is not formed between the adjacent pixels PIX2.

Third Exemplary Embodiment

Figure 21A:
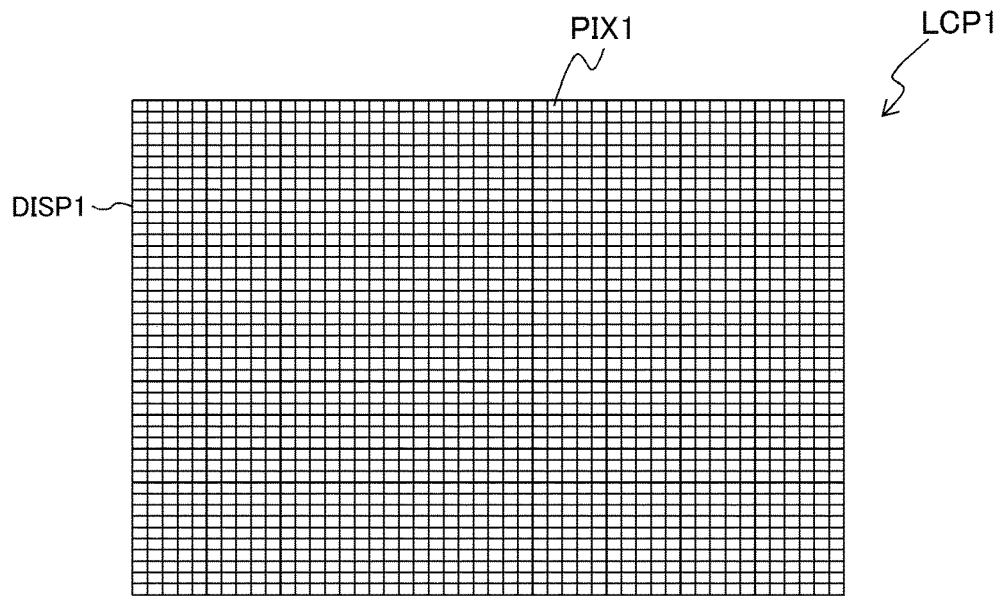
FIG. 21A is a plan view illustrating an arrangement of pixels of a first display panel according to a third exemplary embodiment.
Figure 21B:
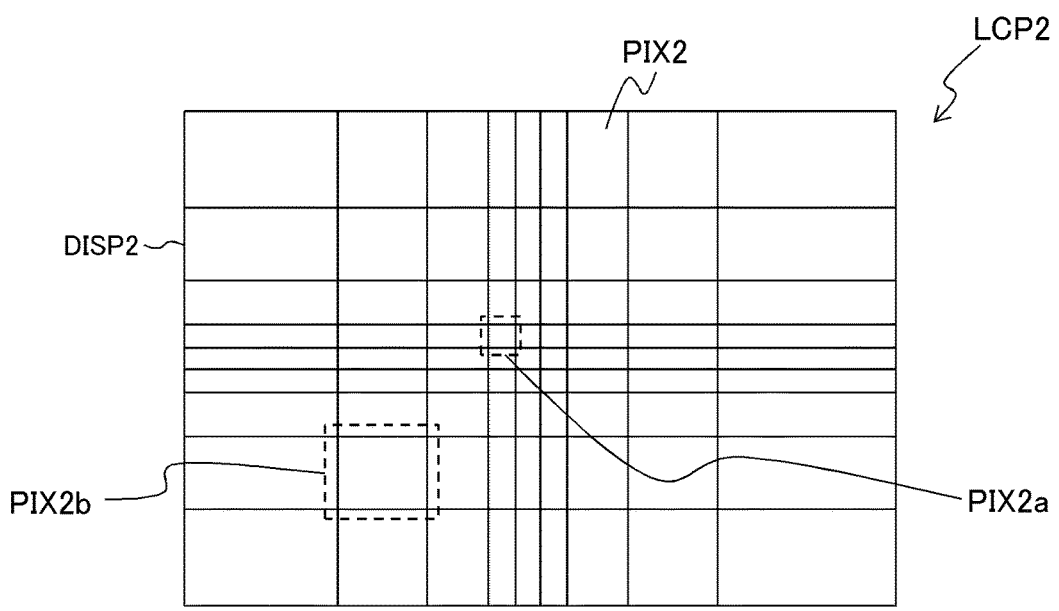
FIG. 21B is a plan view illustrating an arrangement of pixels of a second display panel according to the third exemplary embodiment.

FIG. 21A is a plan view illustrating an arrangement of pixels of first display panel LCP1 according to a third exemplary embodiment, and FIG. 21B is a plan view illustrating an arrangement of pixels of second display panel LCP2 according to the third exemplary embodiment. In first display panel LCP1, a plurality of pixels PIX1 have the identical area and shape, and are disposed at equal intervals in the row direction and the column direction. On the other hand, in second display panel LCP2, a plurality of pixels PIX2 are disposed denser toward a center of second image display region DISP2 while the area and shape of pixel PIX2 are reduced, and the plurality of pixels PIX2 are disposed coarser toward an end of second image display region DISP2 while the area and shape of pixel PIX2 are enlarged.

Figure 22A:
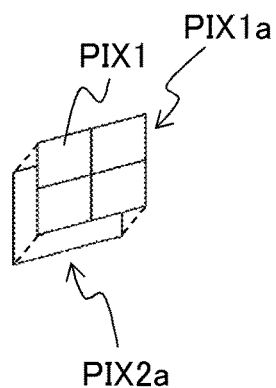
FIG. 22A is a plan view illustrating one pixel disposed on a center side of a second image display region in FIG. 21B and a pixel group of a first display panel overlapping said one pixel.

FIG. 22A is a plan view illustrating one pixel PIX2a disposed on the center side of second image display region DISP2 in FIG. 21B and pixel group PIX1a of first display panel LCP1 overlapping pixel PIX2a. Four pixels PIX1 are disposed so as to overlap one pixel PIX2a. One pixel PIX2a is equal to pixel group PIX1a including four pixels PIX1 in the area of an external shape.

Figure 22B:
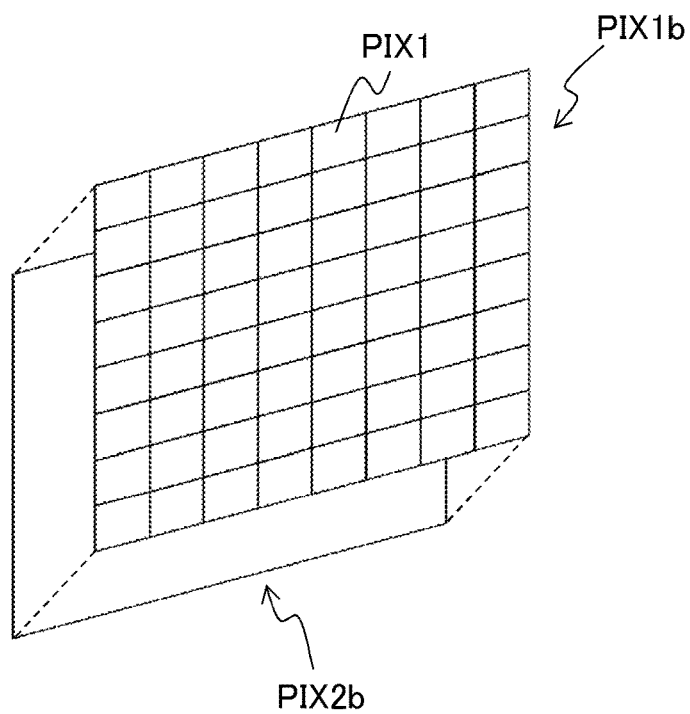
FIG. 22B is a plan view illustrating one pixel disposed on an end side of a second image display region in FIG. 21B and a pixel group of a first display panel overlapping said one pixel.

FIG. 22B is a plan view illustrating one pixel PIX2b disposed on the end side of second image display region DISP2 in FIG. 21B and pixel group PIX1b of first display panel LCP1 overlapping pixel PIX2b. 64 pixels PIX1 are disposed so as to overlap one pixel PIX2b. One pixel PIX2b is equal to pixel group PIX1b including 64 pixels PIX1 in the area of the external shape.

In the above configuration, similar to the first exemplary embodiment, the leakage of the red light and green light can be reduced compared with the conventional configuration, so that the color reproducibility of the blue monochrome image can be improved. The same holds true for monochrome images of other colors. In the above configuration, the cost of liquid crystal display device LCD can be reduced because the numbers of source driver ICs and gate driver ICs of second display panel LCP2 can be decreased compared with first display panel LCP1.

Generally, when an observer watches a display such as a television, a viewpoint of the observer tends to concentrate at a central vicinity of a screen (image display region). At this point, in the above configuration, high resolution is achieved in the central vicinity of second image display region DISP2 of second display panel LCP2, so that the display quality can be improved in the central vicinity of the screen. Additionally, the cost of liquid crystal display device LCD can be reduced compared with the case that the high resolution is achieved in whole second image display region DISP2.

In liquid crystal display device LCD of the third exemplary embodiment, as described in the second exemplary embodiment, first display panel LCP1 may have the pixel arrangement of the low-resolution panel (see FIG. 21B), and second display panel LCP2 may have the pixel arrangement of the high-resolution panel (see FIG. 21A).

In the above, the specific embodiments of the present application have been described, but the present application is not limited to the above-mentioned embodiments, and various modifications may be made as appropriate without departing from the spirit of the present application.

What is claimed is:

1. A liquid crystal display device comprising:
   a first display panel and a second display panel, which are overlapping each other;
   a backlight disposed on rear surface sides of the first display panel and the second display panel, the backlight irradiating the first display panel and the second display panel with light beams in a plurality of colors while sequentially switching the light beams,
   a front polarizing plate and a rear polarizing plate sandwiching therebetween the first display panel and the second display panel; and
   at least one middle polarizing plate disposed between the first display panel and the second display panel, wherein
   each of the first display panel and the second display panel includes a plurality of pixels that are each defined by two source lines adjacent to each other and two gate lines adjacent to each other in plan view, and
   an area of the pixel included in the first display panel is smaller than an area of the pixel included in the second display panel.

2. The liquid crystal display device according to claim 1, wherein the plurality of pixels of the first display panel include a first pixel and a second pixel, the plurality of pixels of the second display panel include a third pixel, and the first pixel and the second pixel overlap the third pixel in plan view.

3. The liquid crystal display device according to claim 2, wherein
   the second display panel is disposed closer to the observer than the first display panel is,
   a black matrix is formed between the third pixel and a pixel adjacent to the third pixel in the second display panel, and
   the black matrix is not formed between the first pixel and the second pixel in the first display panel.

4. The liquid crystal display device according to claim 1, wherein a color filter layer is not formed in either the first display panel or the second display panel.

5. The liquid crystal display device according to claim 1, wherein the number of the pixels disposed in the first display panel is larger than the number of the pixels disposed in the second display panel.

6. The liquid crystal display device according to claim 1, wherein, in the second display panel, the plurality of pixels are disposed denser toward a center of an image display region, and the plurality of pixels are disposed coarser toward an end of the image display region.

* * * * *